(12) United States Patent
Grube

(10) Patent No.: US 9,198,015 B2
(45) Date of Patent: *Nov. 24, 2015

(54) OBTAINING EVENT RESPONSE INFORMATION

(71) Applicant: Gary W. Grube, Barrington Hills, IL (US)

(72) Inventor: Gary W. Grube, Barrington Hills, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,513

(22) Filed: Aug. 20, 2014

(65) Prior Publication Data

US 2014/0359007 A1 Dec. 4, 2014

Related U.S. Application Data

(63) Continuation of application No. 13/300,983, filed on Nov. 21, 2011.

(60) Provisional application No. 61/418,326, filed on Nov. 30, 2010.

(51) Int. Cl.
| | |
|---|---|
| *G06F 15/16* | (2006.01) |
| *H04W 4/22* | (2009.01) |
| *G06Q 10/06* | (2012.01) |
| *H04W 4/02* | (2009.01) |
| *H04W 4/14* | (2009.01) |
| *H04L 29/08* | (2006.01) |
| *H04L 29/06* | (2006.01) |
| *H04W 4/00* | (2009.01) |

(52) U.S. Cl.
CPC ........... *H04W 4/22* (2013.01); *G06Q 10/06315* (2013.01); *H04L 67/36* (2013.01); *H04L 67/42* (2013.01); *H04W 4/02* (2013.01); *H04W 4/14* (2013.01); *H04W 4/00* (2013.01)

(58) Field of Classification Search
CPC ... G06Q 10/06315; H04L 67/36; H04W 4/02; H04W 4/22
USPC .......................................... 709/203, 218, 219
See application file for complete search history.

(56) References Cited

U.S. PATENT DOCUMENTS

| | | | |
|---|---|---|---|
| 6,253,091 B1 * | 6/2001 | Naddell et al. ................. | 455/519 |
| 6,400,265 B1 * | 6/2002 | Saylor et al. .................. | 340/531 |
| 6,630,892 B1 * | 10/2003 | Crockford et al. ............ | 340/904 |
| 6,661,340 B1 * | 12/2003 | Saylor et al. .................. | 340/517 |
| 6,965,313 B1 * | 11/2005 | Saylor et al. ............. | 340/539.18 |
| 7,113,090 B1 * | 9/2006 | Saylor et al. ............. | 340/539.18 |
| 2003/0100326 A1 * | 5/2003 | Grube et al. .................. | 455/515 |

(Continued)

*Primary Examiner* — Mohamed Wasel
(74) *Attorney, Agent, or Firm* — Garlick & Markison; Timothy W. Markison

(57) ABSTRACT

A method begins by a processing module establishing information regarding a potentially adverse event. The method continues with the processing module determining group constraints for a group regarding the potentially adverse event, wherein the group constraints includes one or more of: family member devices, neighbor devices, friend devices, first responders, co-workers, and devices of other persons having an affiliating commonality. The method continues with the processing module determining whether a temporary group exists regarding the potentially adverse event and that is in accordance with the group constraints. When the temporary group exists regarding the potentially adverse event that is in accordance with the group constraints, the method continues with the processing module identifying event response information regarding the potentially adverse event and selecting a portion of the event response information.

20 Claims, 12 Drawing Sheets

(56) References Cited

U.S. PATENT DOCUMENTS

| | | | |
|---|---|---|---|
| 2003/0126250 A1* | 7/2003 | Jhanji | 709/223 |
| 2004/0247086 A1* | 12/2004 | Menard et al. | 379/45 |
| 2005/0002499 A1* | 1/2005 | Ordille et al. | 379/88.12 |
| 2006/0273893 A1* | 12/2006 | Warner | 340/531 |
| 2007/0112511 A1* | 5/2007 | Burfeind et al. | 701/213 |
| 2008/0266118 A1* | 10/2008 | Pierson et al. | 340/573.6 |
| 2009/0327415 A1* | 12/2009 | Alberth et al. | 709/204 |
| 2010/0017607 A1* | 1/2010 | Shkolnikov et al. | 713/168 |
| 2011/0117878 A1* | 5/2011 | Barash et al. | 455/404.2 |
| 2011/0320485 A1* | 12/2011 | Yin et al. | 707/769 |
| 2012/0252398 A1* | 10/2012 | Jacobs et al. | 455/404.1 |
| 2013/0040661 A1* | 2/2013 | Grube et al. | 455/456.3 |

* cited by examiner

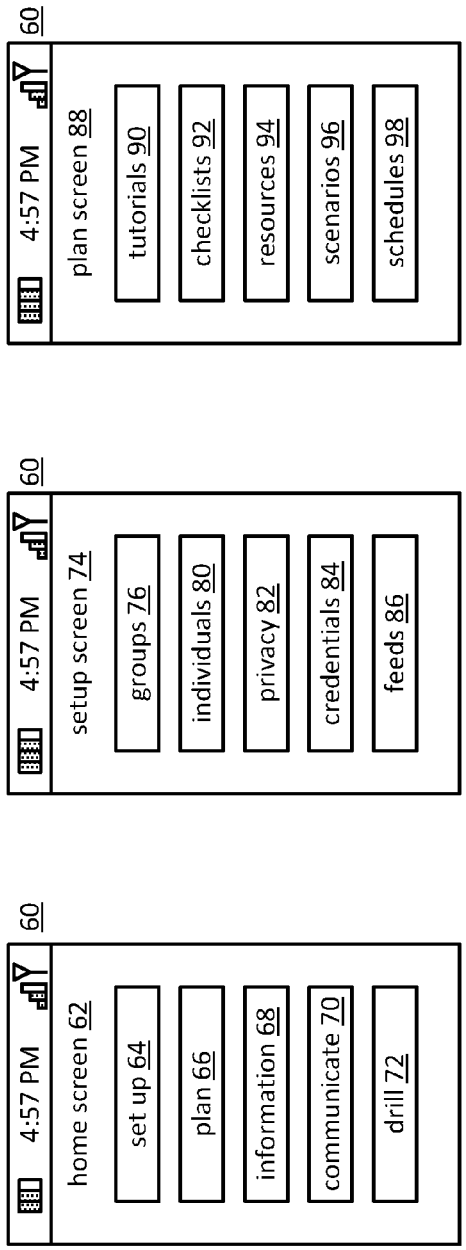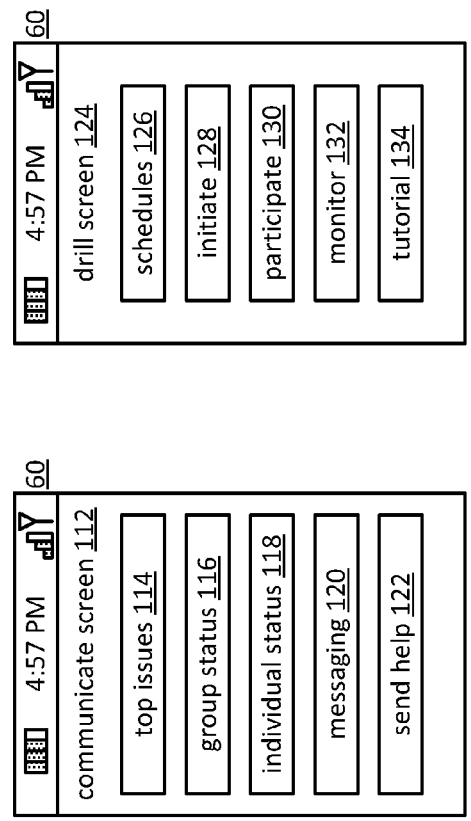

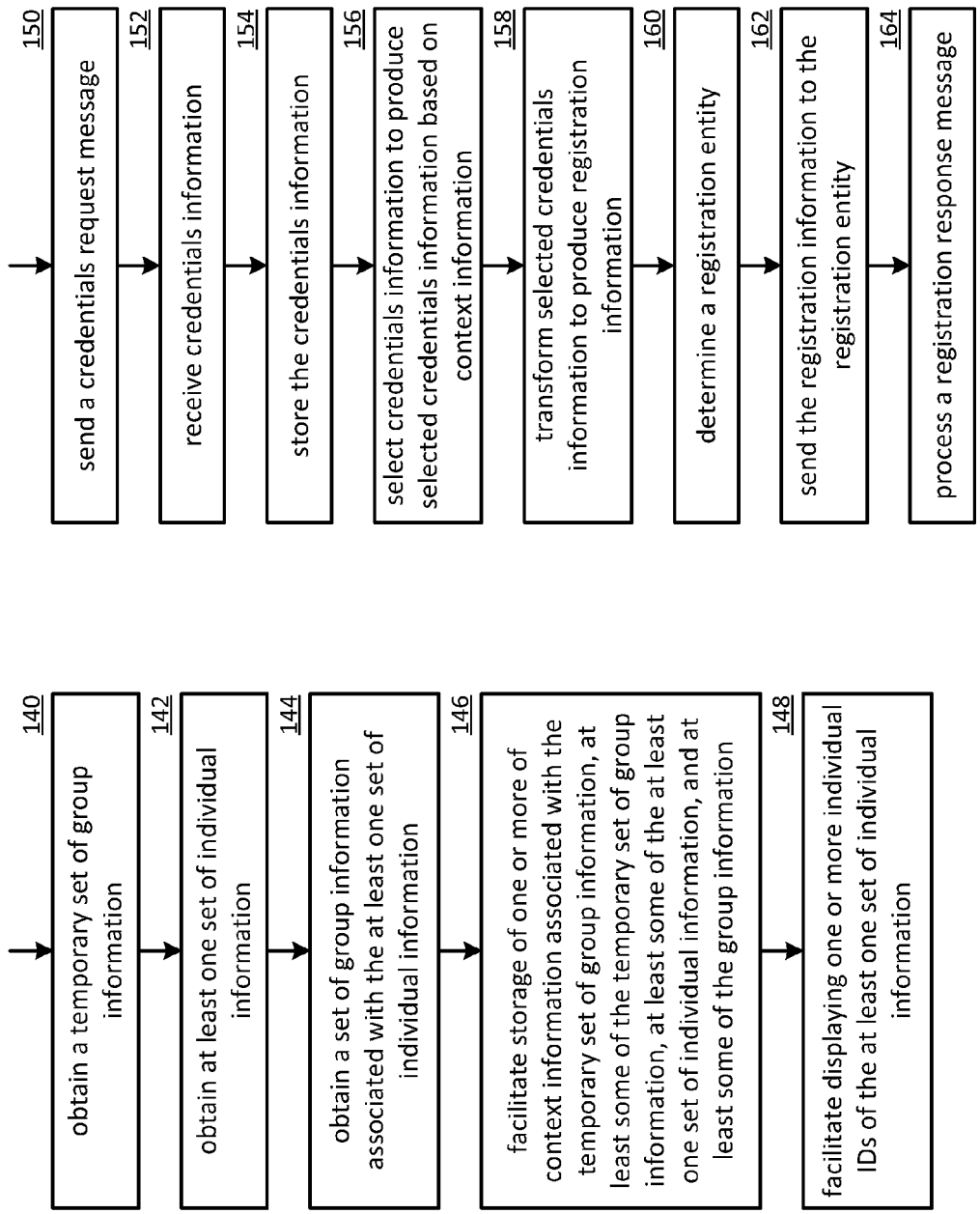

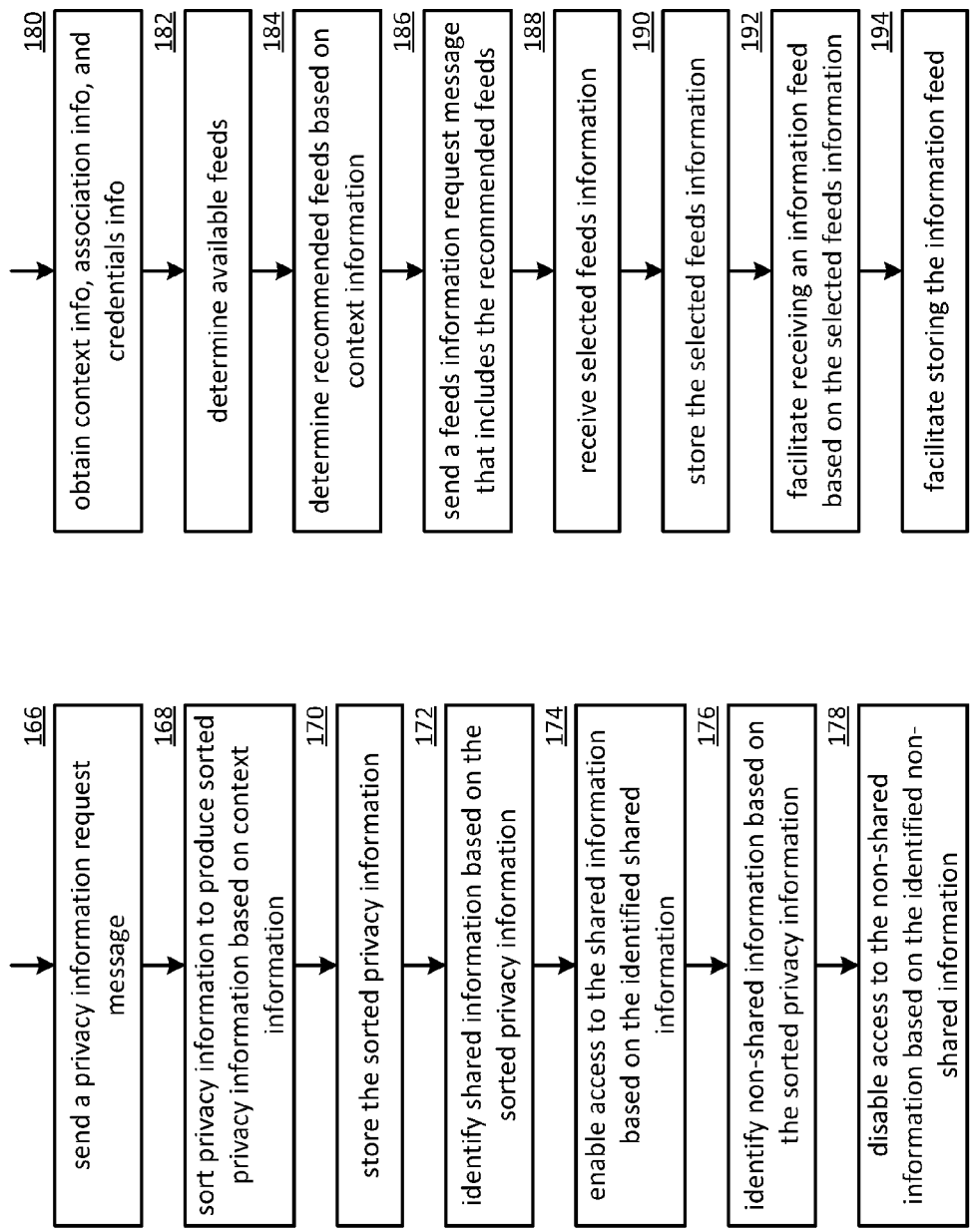

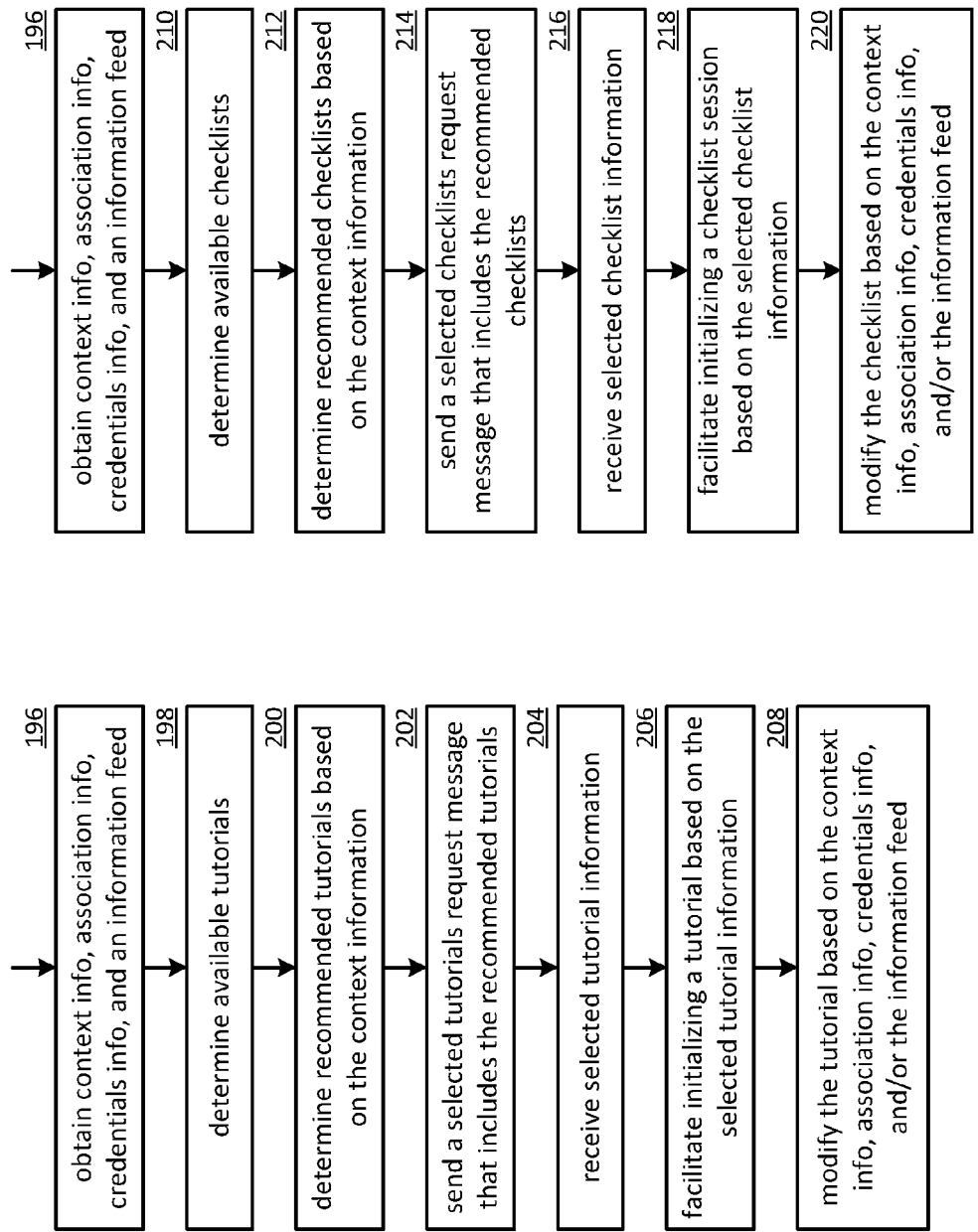

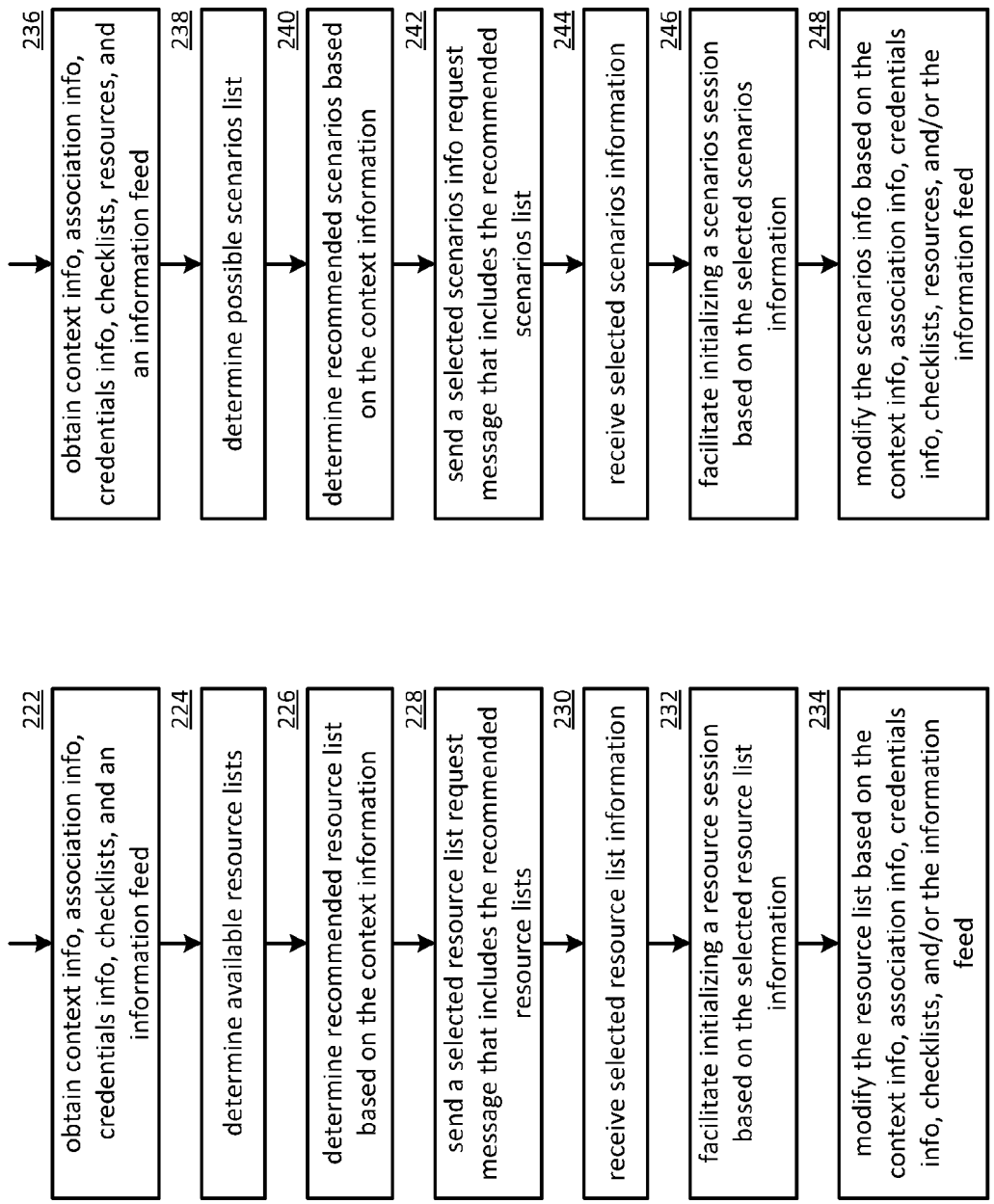

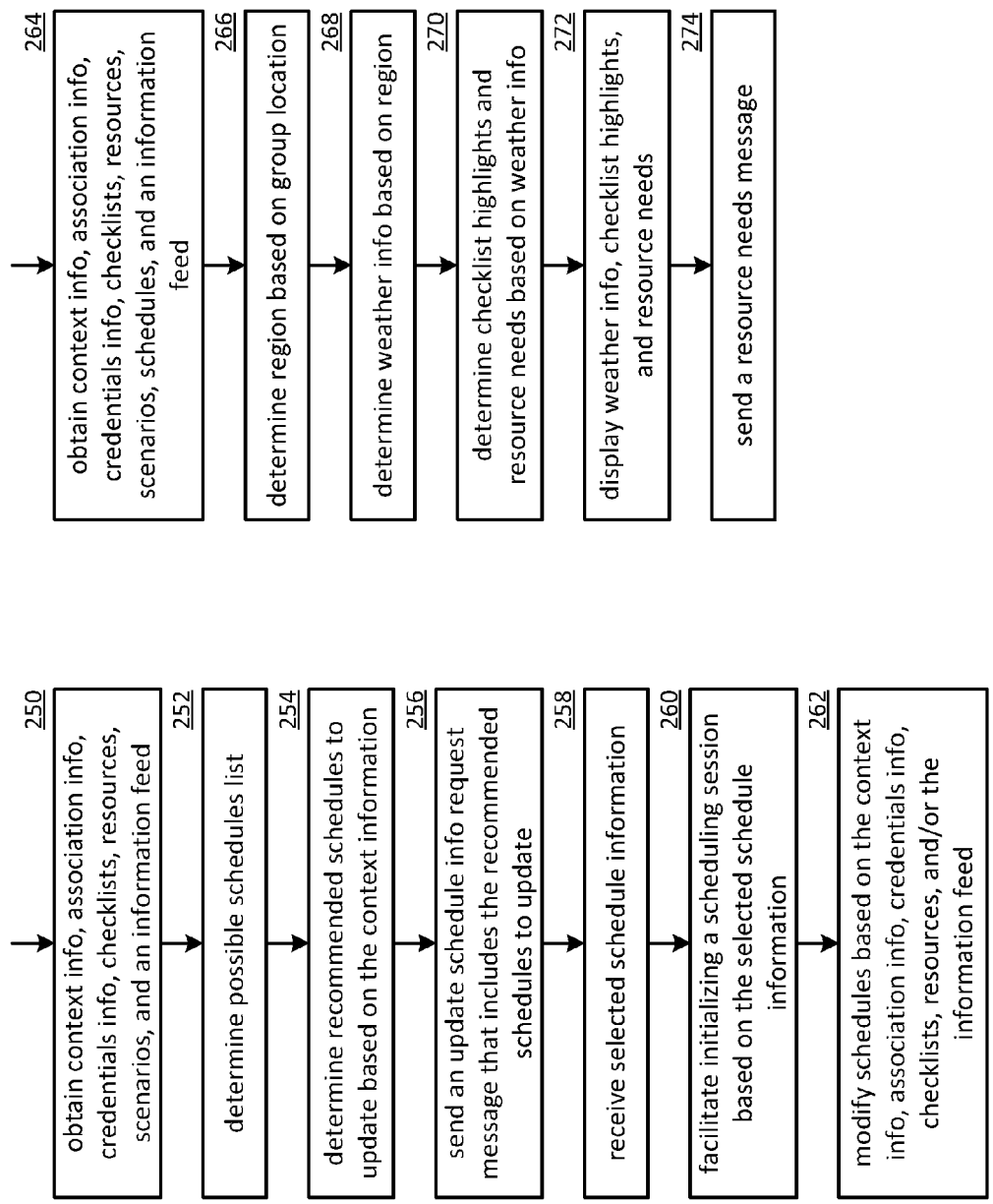

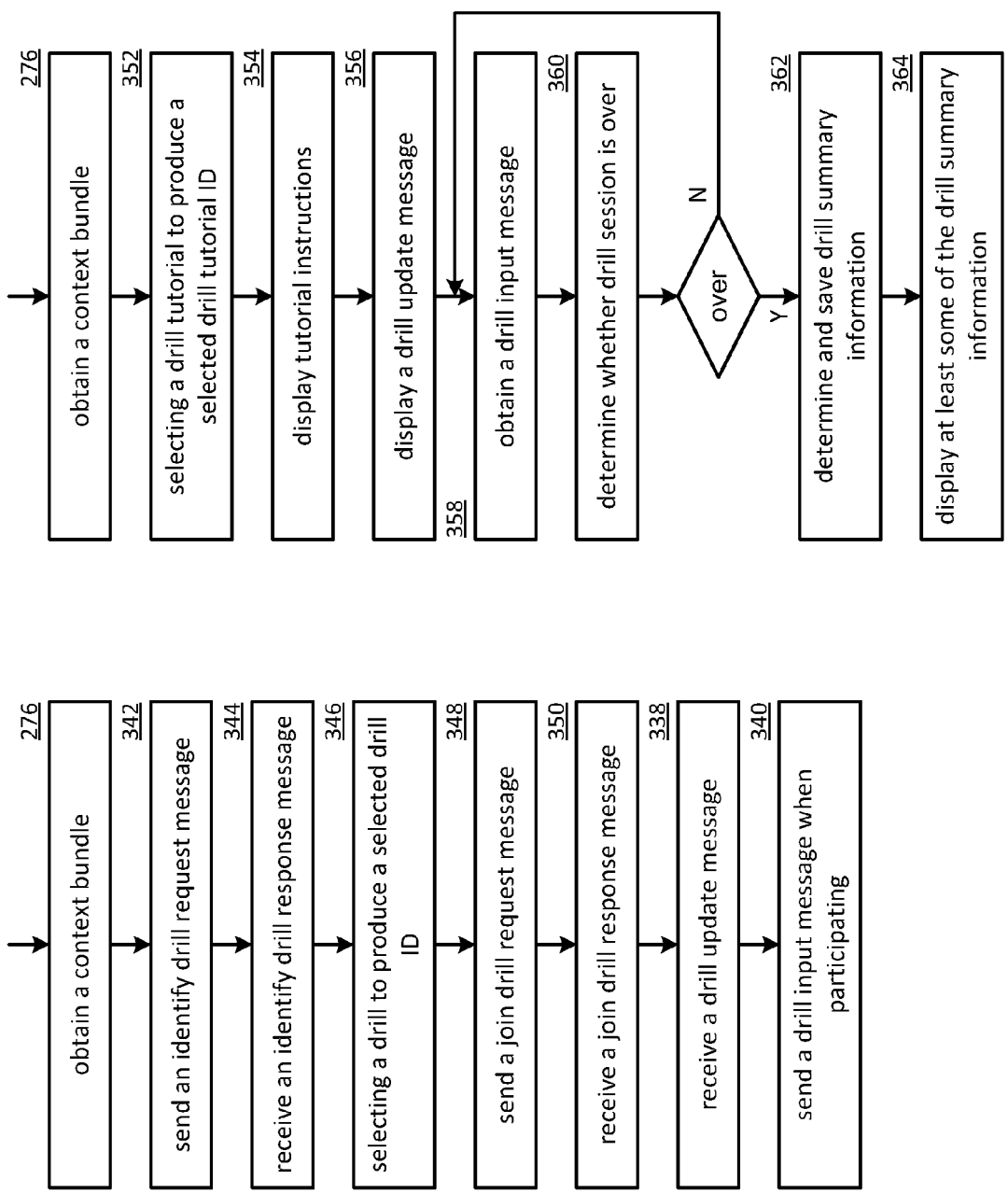

OBTAINING EVENT RESPONSE INFORMATION

CROSS REFERENCE TO RELATED PATENTS

The present U.S. Utility Patent Application claims priority pursuant to 35 U.S.C. §120 as a continuation of U.S. Utility application Ser. No. 13/300,983, entitled "OBTAINING GROUP AND INDIVIDUAL EMERGENCY PREPAREDNESS COMMUNICATION INFORMATION", filed Nov. 21, 2011, now U.S. Pat. No. 8,874,773, issued on Oct. 28, 2014, which claims priority pursuant to 35 U.S.C. §119(e) to U.S. Provisional Application No. 61/418,326, entitled "EMERGENCY PREPAREDNESS INFORMATION PROCESSING", filed Nov. 30, 2010, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to emergency preparedness information processing within such computing systems.

2. Description of Related Art

Emergencies are known to be associated with direct costs (e.g., rebuilding), indirect costs (e.g., higher insurance premiums), and serious loss of life. Such emergencies include man-made emergencies and natural disasters. Examples of man-made emergencies are known to include traffic accidents, structure fires, chemical spills, railroad accidents, aircraft accidents, shipping accidents, criminal activities, and terrorism. Examples of natural disasters are known to include hurricanes, typhoons, earthquakes, forest fires, mudslides, floods, droughts, dust storms, hail storms, extreme heat, extreme cold, and snow storms.

Emergency management is known to address reducing the impact of emergencies by avoiding risks associated with emergencies and by utilizing more effective practices and tools to respond to emergencies. Emergency management is known to partition such management into phases including a mitigation phase (e.g., to reduce risks, to reduce the effects of disasters), a preparedness phase (e.g., planning, resourcing, drilling), a response phase (e.g., primary resource activation, secondary resource activation), and a recovery phase (e.g., rebuilding).

Emergency impact may be abated by improving the effectiveness of the preparedness phase. For example, preparing a resource checklist that is relevant to a group of individuals and a particular emergency scenario may improve the effectiveness of a subsequent response phase. In another example, providing a training tutorial that is relevant to the group of individuals and the particular emergency scenario may also improve the effectiveness of the subsequent response phase. In another example, providing a training drill that is relevant to the group of individuals and the particular emergency scenario that utilizes resources from the resource checklist and process steps from the training tutorial may also improve the effectiveness of the subsequent response phase.

Emergency impact may be abated by improving the effectiveness of the response phase. For example, effective communications between individuals and groups of individuals affected by (e.g., victims, including individuals, families, co-workers, etc.) or responding to an emergency (e.g., first responders, second responders, aid workers, volunteers, individuals) may improve the effectiveness of the response phase. In an instance, a first family member communicates with a second family member via a cellular telephone with instructions including where to go for help. In another instance, a second responder communicates with a volunteer indicating needed resources at the scene of an emergency.

Computing systems are known to process data into information, store information and communicate information. Such information may include emergency preparedness information and response phase communications information. Individuals utilize computing systems to gain access to such emergency preparedness information. Despite such access, individuals may not always obtain desired or optimal emergency preparedness information due to complexities associated with a relevant emergency scenario, resource gaps, chain of command, lack of training, and tension associated with emergency. Individuals utilize public computing systems (e.g., the internet, wireless devices, wireless networks) to communicate response phase communications information during an emergency. Despite such utilization, public computing systems (e.g., a commercial wireless carrier network) typically can't sustain a demanded traffic volume of such response phase communications information when the demanded traffic volume is multiples of a typical non-emergency time period. In an instance, a cellular network may provide tens of voice call communications paths per cellular tower when hundreds of voice call resources are in demand. One solution is to utilize text messaging rather than voice telephony to carry out communication of the response phase communications information. For example, hundreds of individuals can communicate via text messaging utilizing a similar cellular network channel resource that can only support a single voice call. Despite such texting capability, effective utilization of texting services is impacted by one more of identifying other users to communicate with, entering identifiers associated with the other users, and rapidly exchanging the response phase communications information.

BRIEF DESCRIPTION OF THE SEVERAL VIEWS OF THE DRAWING(S)

FIG. 3A is a display rendering illustrating an example of a home screen in accordance with the invention;

FIG. 3B is a display rendering illustrating an example of a setup screen in accordance with the invention;

FIG. 3C is a display rendering illustrating an example of a planning screen in accordance with the invention;

FIG. 3D is a display rendering illustrating an example of an information screen in accordance with the invention;

FIG. 3E is a display rendering illustrating an example of a communication screen in accordance with the invention;

FIG. 3F is a display rendering illustrating an example of a drill screen in accordance with the invention;

FIG. 4 is a flowchart illustrating an example of obtaining identification information in accordance with the invention;

FIG. 5 is a flowchart illustrating an example of obtaining credential information in accordance with the invention;

FIG. 6 is a flowchart illustrating an example of obtaining privacy information in accordance with the invention;

FIG. 7 is a flowchart illustrating an example of obtaining feeds information in accordance with the invention;

FIG. 8 is a flowchart illustrating an example of selecting a tutorial in accordance with the invention;

FIG. 9 is a flowchart illustrating an example of selecting a checklist in accordance with the invention;

FIG. 10 is a flowchart illustrating an example of selecting resources in accordance with the invention;

FIG. 11 is a flowchart illustrating an example of determining scenarios information in accordance with the invention;

FIG. 12 is a flowchart illustrating an example of determining schedules information in accordance with the invention;

FIG. 13 is a flowchart illustrating an example of determining environmental information in accordance with the invention;

FIG. 20 is a flowchart illustrating an example of participating in a drill sequence in accordance with the invention; and FIG. 21 is a flowchart illustrating an example of executing a drill tutorial in accordance with the invention.

DETAILED DESCRIPTION OF THE INVENTION

Figure 1:
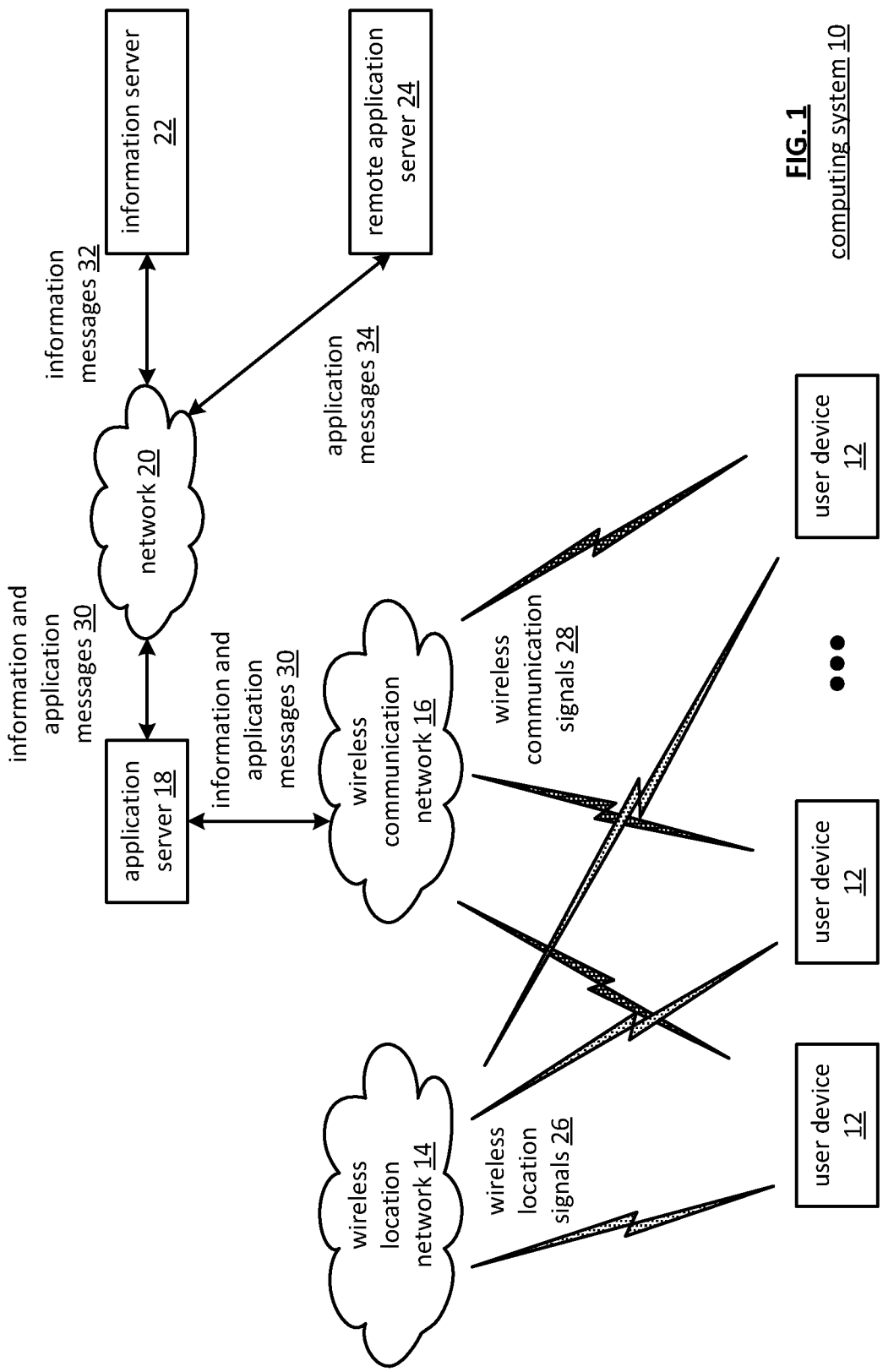
FIG. 1 is a schematic block diagram of an embodiment of a computing system in accordance with the invention.

FIG. 1 is a schematic block diagram of an embodiment of a computing system 10 that includes a plurality of user devices 12, a wireless location network 14, a wireless communication network 16, an application server 18, a network 20, an information server 22, and a remote application server 24. The wireless location network 14 includes one or more of a public wireless location system (e.g., global positioning satellite (GPS), a cellular network) and one or more private wireless location systems (e.g., wireless beacon, a wireless local area network (WLAN)). The wireless location network 14 sends wireless location signals 26 to the plurality of user devices 12 to enable determination of location information.

The wireless communications network 16 includes one or more of a public wireless communications system and a private wireless communications system and may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16. The wireless communication network 16 sends wireless communications signals 28 to the plurality of user devices 12 and receives wireless communications signals 28 from the plurality of user devices 12 to communicate information and application messages 30. Alternatively, or in addition to, the plurality of user devices 12 may send and receive the wireless communications signals 28 directly between two or more user devices 12 of the plurality of user devices 12.

The application server 18 includes a processing module and memory to support execution of one or more applications (e.g., an emergency preparedness application). The processing module may be a single processing device or a plurality of processing devices. Such a processing device may be implemented with one or more of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. The memory device may be a read-only memory, random access memory, volatile memory, non-volatile memory, static memory, dynamic memory, flash memory, cache memory, and/or any device that stores digital information. The processing devices may be centrally located (e.g., directly coupled together via a wired and/or wireless bus structure) when the processing module includes more than one processing device, or may be distributedly located (e.g., cloud computing via indirect coupling via a local area network and/or a wide area network). The memory and/or memory element storing the corresponding operational instructions may be embedded within, or external to, the circuitry comprising the state machine, analog circuitry, digital circuitry, and/or logic circuitry when the processing module implements one or more of its functions via a state machine, analog circuitry, digital circuitry, and/or logic circuitry. The memory element stores hardcoded and/or operational instructions and the processing module executes the hardcoded and/or operational instructions corresponding to at least some of the steps and/or functions illustrated in FIGS. 1-21.

The network 20 may include one or more of wireless and/or wireline communications systems, one or more private communications systems, and a public internet system. The application server 18 communicates information and application messages 30 via the wireless communication network 16 to the plurality of user devices 12 and via the network 20 to the information server 22 and the remote application server 24. The information server 22 includes a processing module and memory to support storage and retrieval of information (e.g., emergency preparedness information) via information messages 32. For example, the information server 22 streams emergency preparedness information via the network 20 and the wireless communication network 16 to one or more of the user devices 12. As another example, information server 22 sends emergency preparedness information to user device 12 in response to receiving a request for emergency preparedness information from the user device 12. The remote application server 24 includes a processing module and memory to support execution of one or more applications (e.g., the emergency preparedness application). For example, the remote application server 24 sends an application output response message as an application message 34 to the user device 12 in response to receiving an application request as the application message 34 from the user device 12.

The plurality of user devices 12 may be a portable computing device (e.g., a smart phone, a tablet computer, a laptop a handheld computer and/or any other portable device that includes a computing unit) and/or a fixed computing device (e.g., a desktop computer, a cable television set-top box, an application server, an internet television user interface and/or any other fixed device that includes a computing unit). Such a portable or fixed computing device includes one or more of a computing unit (e.g., providing processing module functionality), one or more wireless modems, sensors, and one or more user interfaces. An embodiment of the user device 12 will be described in greater detail with reference to FIG. 2.

In general and with respect to emergency preparedness, the system 10 supports three primary functions: emergency preparedness planning, emergency preparedness drilling, and response phase emergency communications. In accordance with these three primary functions, emergency preparedness plans can be created that are relevant in relationship to likely emergency scenarios and those affected, the emergency preparedness plans can be exercised by way of drilling and training to enable more efficient operations during an emergency response phase, and communications can be provided during an emergency response that is efficient in terms of mitigation resource utilization and relevant in terms of scope and nature of an associated emergency scenario.

The first primary function includes the user device determining emergency preparedness planning information. In an example of operation, the user device 12 determines location information based on receiving the wireless location signals 26. Next, the user device 12 sends a checklist request message that includes the location information to the application server 18 as wireless communications signals 28 via the wireless communications network 16. The application server 18 determines recommended checklists based on the location information to produce recommended checklists (e.g., a hurricane checklist, a tornado checklist, etc.). For instance, the application server 18 determines the recommended checklists to include the hurricane checklist and the tornado checklist when the location information indicates that the user device is located in central Florida. As another instance, the application server 18 determines the recommended checklists to include an earthquake checklist and a wildfire checklist when the location information indicates that the user device is located in Southern California. The application server 18 sends the recommended checklists to the user device 12. The user device 12 displays the recommended checklists and receives user input to produce a selected checklist. The user device 12 sends the selected checklist to the application server 18. The application server 18 determines selected checklist information based on the selected checklist. The application server 18 sends the selected checklist information to the user device 12. The user device 12 displays the selected checklist information and receives user input. The user device 12 modifies checklist item availability status to produce modified checklist item availability status. The user device 12 stores the modified checklist item availability status and may send the modified checklist item availability status to the application server 18 and/or the information server 22. In addition, the user device 12 may produce a checklist item reminder (e.g., a visual and audible alert) in accordance with a checklist alert schedule when the modified checklist item availability status compares unfavorably to a checklist item availability template. The method of operation to determine emergency preparedness planning information is discussed in greater detail with reference to FIGS. 3A-21.

The second primary function includes the user device 12 participating in emergency preparedness drilling. In an example of operation, the user device 12 obtains location information and other context information (e.g., including a drill schedule) to produce a context bundle. The user device 12 sends a drill request message to the remote application server 24 that includes the context bundle. The remote application server 24 determines drill parameters (e.g., a drill scenario) and a drill identifier (ID) based on the drill request message. For instance, the remote application server 24 determines the drill scenario to be a hurricane drill based on the location information indicating that the user device 12 is near the Atlantic Ocean. As another instance, the remote application server 24 determines the drill scenario to be an earthquake drill based on the location information indicating that the user device 12 is near an earthquake fault line. The remote application server 24 sends the drill parameters and the drill ID to the user device 12. The remote application server 24 initializes a drill application associated with the drill ID and in accordance with the drill parameters. The remote application server 24 sends a drill update message to the user device 12 that includes drill application output associated with the drill application. The user device 12 receives the drill update message and sends the drill application output to a display associated with the user device. The user device 12 receives user input to produce drill input information. The user device 12 sends a drill input message to the remote application server 24 that includes the drill input information. The remote application server 24 receives the drill input message and provides the drill application with the drill input information to produce updated drill application output. The remote application server 24 sends a second drill update message to the user device 12 that includes the updated drill application output. The process repeats until the application reaches an end point. The method of operation to participate in drilling is discussed in greater detail with reference to FIGS. 3A-21.

The third primary function includes the user device 12 communicating during an emergency response phase. In an example of operation, the user device 12 obtains location information and other context information (e.g., including a group ID affiliation) to produce the context bundle. The user device 12 obtains local status (e.g., ok, getting help, need help, etc.) via a user prompt. Next, the user device 12 sends a status request message to the application server 18 that includes the local status and the context bundle. The application server 18 receives the status request message and determines a status associated with each user device 12 affiliated with the group ID. For instance, the application server 18 sends a status request message to the other user devices 12 affiliated with the group ID and receives status response messages indicating status. The application server 18 sends a status response message that includes status information of the other user devices 12 affiliated with the group ID to the user device. The user device 12 receives the status response message and displays the status information in accordance with the context bundle. For instance, the user device 12 displays names associated with the other user devices 12 and utilizes a colored icon to indicate status of the other user device (e.g., red for not okay, green for okay). As another instance, the user device 12 displays names associated with the other user devices in a rank ordered list where the ranking is by relative distance away from the user device 12 as determined utilizing status information associated with the other user devices 12. As another instance, the user device 12 displays the names associated with the other user devices 12 on a map where in the center of the map is a location associated with the user device 12. The method of operation to communicate is discussed in greater detail with reference to FIGS. 3A-21.

Figure 2:
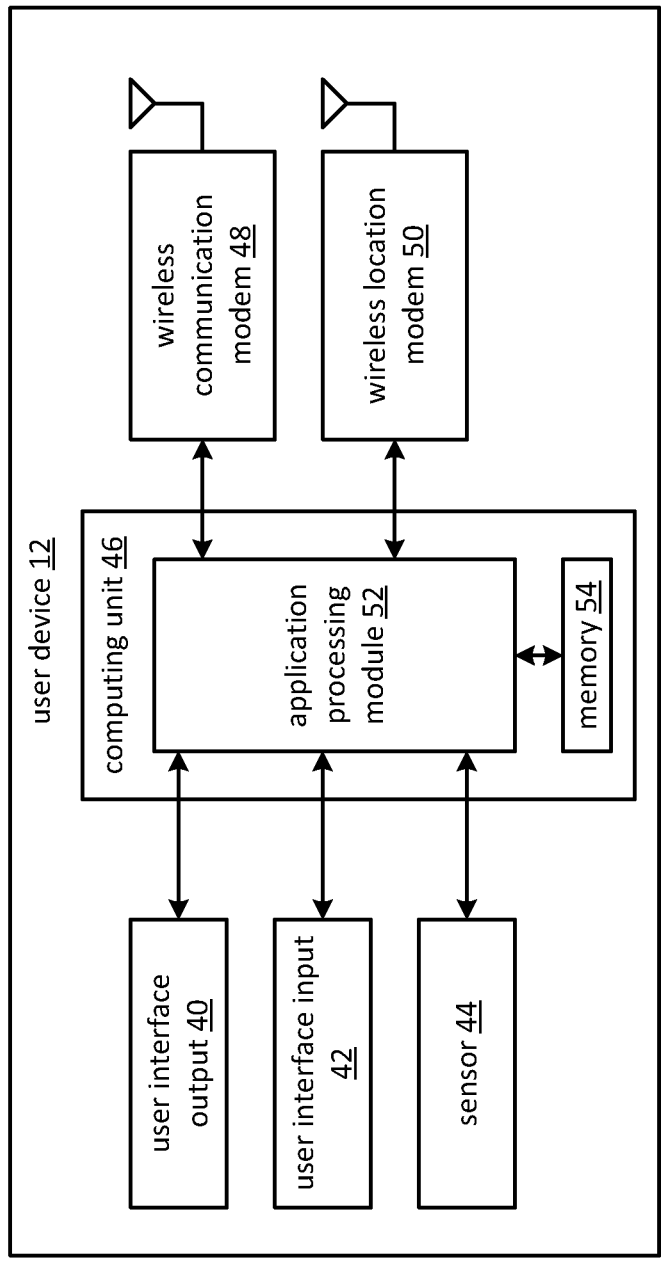
FIG. 2 is a schematic block diagram of an embodiment of a user device in accordance with the invention.

FIG. 2 is a schematic block diagram of an embodiment of a user device 12 that includes a user interface output 40, a user interface input 42, a sensor 44, a computing unit 46, a wireless communications modem 48, and a wireless location modem 50. The user interface output 40 may be a single interface output device or a plurality of interface output devices. The interface output device 40 may include one or more of a display, a touch screen, a speaker, an earpiece, a motor, an indicator light, a transducer, and a digital indicator. For instance, the interface output device 40 includes a color touch screen display capable of rendering static images and/or full-motion video. The user interface input 42 may be a single interface input device or a plurality of interface input devices. The interface input device includes one or more of a touch screen sensor array, a keyboard, a microphone, a fingerprint reader, a trackball, a mouse sensor, a pushbutton, and a selector switch. For instance, the interface input device includes a touch screen sensor array associated with the color touch screen display. The sensor 44 may be a single sensor device or a plurality of sensor devices. The sensor device includes capabilities for sensing one or more of a magnetic field (e.g., a compass), motion, temperature, pressure, altitude, humidity, an image, a stream of images (e.g., capture video), biometrics, proximity, capacitance, gases, radiation, pathogens, light levels, and bio hazards.

The wireless communications modem 48 may include a single wireless transceiver or a plurality of wireless transceivers. The wireless transceiver may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16. The wireless location modem 50 may include one or more of a single wireless location receiver, a single wireless location transceiver, a plurality of wireless location receivers, and a plurality of wireless location transceivers. The wireless location receiver and wireless location transceiver may operate in accordance with one or more wireless location technologies including GPS, Wi-Fi, angle of arrival, time difference of arrival, signal strength, and beaconing.

The computing unit 46 includes an application processing module 52, a memory 54 one or more interfaces to one or more of the user interface output 40, user interface input 42, the sensor 44, the wireless communication modem 48, and the wireless location modem 50. The memory 54 may include a single memory device or a plurality of memory devices. The memory device may be a read-only memory, random access memory, volatile memory, non-volatile memory, cache memory, and/or any device that stores digital information. Memory device examples include static random access memory (SRAM), dynamic random access memory (DRAM), NAND flash memory, magnetic memory (e.g., a hard disk), and optical memory (e.g., an optical disc).

The application processing module 52 may be a single processing device or a plurality of processing devices. The processing device may include one or more of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The application processing module 52 may have an associated memory and/or memory element, which may be a single memory device, a plurality of memory devices, and/or embedded circuitry of the application processing module.

The memory device 54 include one or more of a read-only memory, random access memory, volatile memory, non-volatile memory, static memory, dynamic memory, flash memory, cache memory, and/or any device that stores digital information. The processing devices may be centrally located (e.g., directly coupled together via a wired and/or wireless bus structure) when the application processing module includes more than one processing device, or the processing devices may be distributedly located (e.g., cloud computing via indirect coupling via a local area network and/or a wide area network). The memory and/or memory element storing the corresponding operational instructions may be embedded within, or external to, the circuitry comprising the state machine, analog circuitry, digital circuitry, and/or logic circuitry) when the application processing module implements one or more of its functions via a state machine, analog circuitry, digital circuitry, and/or logic circuitry. The memory element stores hard coded and/or operational instructions and the application processing module executes the hard coded and/or operational instructions corresponding to at least some of the steps and/or functions illustrated in FIGS. 3A-21.

FIG. 3A is a display rendering illustrating an example of a home screen 62 generated by an emergency preparedness application executing on an application processing module. The home screen 62 may be utilized to indicate emergency preparedness application options and to prompt for user input to execute one or more portions of the emergency preparedness application. The home screen 62 includes one or more of a set of soft keys and a user device status area 60 including one or more of a battery indicator level, a date, a time of day, a wireless location status indicator, and a wireless communication signal strength indicator. The set of soft keys includes one or more of a setup 64, a plan 66, information 68, communicate 70, and drill 72. A method of operation of the application processing module is discussed in greater detail with reference to FIGS. 4-21.

FIG. 3B is a display rendering illustrating an example of a setup screen 74 generated by an emergency preparedness application executing on an application processing module. The setup screen 74 may be utilized to indicate emergency preparedness application options in regards to set up and to prompt for user input to gather setup information and to execute one or more portions of the emergency preparedness application. The setup screen 74 includes one or more of a set of soft keys and a user device status area 60. The set of soft keys includes one or more of group 76, individuals 80, privacy 82, credentials 84, and feeds 86. A method of operation of the application processing module is discussed in greater detail with reference to FIGS. 4-7.

FIG. 3C is a display rendering illustrating an example of a planning screen 88 generated by an emergency preparedness application executing on an application processing module. The planning screen 88 may be utilized to indicate emergency preparedness application options in regards to planning and to prompt for user input to gather planning information and to execute one or more portions of the emergency preparedness application. The planning screen 88 includes one or more of a set of soft keys and a user device status area 60. The set of soft keys includes one or more of tutorials 90, checklists 92, resources 94, scenarios 96, and schedules 98. A method of operation of the application processing module is discussed in greater detail with reference to FIGS. 8-12.

FIG. 3D is a display rendering illustrating an example of an information screen 100 generated by an emergency preparedness application executing on an application processing module. The information screen 100 may be utilized to indicate emergency preparedness application options in regards to information and to prompt for user input to gather information and to execute one or more portions of the emergency preparedness application. The information screen 100 includes one or more of a set of soft keys and a user device status area 60. The set of soft keys includes one or more of environment 102, local events 104, national events 106, live feeds 108, and search 110. A method of operation of the application processing module is discussed in greater detail with reference to FIGS. 13-15.

FIG. 3E is a display rendering illustrating an example of a communication screen 112 generated by an emergency preparedness application executing on an application processing module. The communication screen 112 may be utilized to indicate emergency preparedness application options in regards to communication and to prompt for user input to communicate and to execute one or more portions of the emergency preparedness application. The communication screen 112 includes one or more of a set of soft keys and a user device status area 60. The set of soft keys includes one or more of top issues 114, group status 116, individual status 118, messaging 120, and send help 122. A method of operation of the application processing module is discussed in greater detail with reference to FIGS. 16-18.

FIG. 3F is a display rendering illustrating an example of a drill screen 124 generated by an emergency preparedness application executing on an application processing module. The drill screen 124 may be utilized to indicate emergency preparedness application options in regards to drilling and to prompt for user input to drill and to execute one or more portions of the emergency preparedness application. The drill screen 124 includes one or more of a set of soft keys and a user device status area 60. The set of soft keys includes one or more of schedules 126, initiate 128, participate 130, monitor 132, and tutorial 134. A method of operation of the application processing module is discussed in greater detail with reference to FIGS. 19-21.

FIG. 4 is a flowchart illustrating an example of obtaining identification information. A method begins with step 140 where a processing module (e.g., an application processing module of a user device) obtains a temporary set of group information, wherein group information pertains to a group identifier (ID), and wherein the group ID is associated with a corresponding set of individual identifiers (IDs) of a plurality of individual IDs. The group information may include one or more of a group ID, a group name, a geographic region associated with a group ID, a context association with a group ID, and contact information. A group ID may be associated with a group type, wherein the group type may include one or more of a family, friends, a workgroup, a company a community organization, a neighborhood, a city, a region, a club, a common interest, and any other affiliating commonality. Each individual ID of the plurality of individual IDs may not be associated with at least one group ID.

The obtaining the temporary set of group information further includes determining context information and identifying a set of group IDs of the temperate set of group information based on the context information. The context information includes one or more of location coordinates, current weather conditions, forecasted weather conditions, a sensor input, date information, time information, a current activity, a scheduled activity, a current event, and a scheduled event. The determining the context information includes at least one of querying an application server, receiving a message, a local memory lookup, receiving an input device output, receiving a user device sensor output, and decoding wireless location signals to produce location coordinates. For example, the processing module obtains the temporary set of group information to include group ID 54 when location coordinates associated with group ID 54 are substantially the same as location coordinates of the context information.

Alternatively, or in addition to, the obtaining the temporary set of group information includes at least one of receiving at least some of the temporary set of group information from a user input and retrieving the temporary set of group information. The receiving includes facilitating outputting a user prompt that includes at least some of the context information and receiving a group ID selection in a user response. The retrieving includes generating a group ID request that includes at least some of the context information; sending the group ID request to at least one of an information server, an application server, and another user device; and receiving a group ID response that includes a group ID.

The method continues at step 142 where the processing module obtains at least one set of individual information, wherein individual information pertains to an individual ID of the plurality of individual IDs. The individual information includes one or more of an individual ID, an individual ID that is not associated with the temporary set of group information, an individual name, a geographic region associated with an individual ID, and contact information. The contact information may include one or more of a voice telephone number, a short message service (SMS) telephone number, an internet protocol (IP) address, an email address, a uniform resource locator (URL), and a facsimile (FAX) telephone number. The obtaining the at least one set of individual information includes receiving at least some of the at least one set of individual information from a user input and retrieving the at least one set of individual information. Alternatively, or in addition to, the obtaining the at least one set of individual information further includes obtaining (e.g., retrieving, generating) context information and identifying (e.g., receiving, and retrieving) an individual ID of the at least one set of individual information based on the context information.

The method continues at step 144 where the processing module obtains a set of group information associated with the at least one set of individual information based on the temporary set of group information. All individual IDs of the at least one set of individual information are associated with at least one group ID. The obtaining the set of group information associated with the at least one set of individual information includes at least one of outputting a user prompt that includes at least some of the temporary set of group information, extracting at least some of the temporary set of group information from a user input, and receiving a group ID selection user input that includes at least some of the temporary set of group information. Alternatively, or addition to, the obtaining the set of group information associated with the at least one set of individual information further includes generating a group information request based on the at least one set of individual information, facilitating outputting the group information request (e.g., to at least one of an information server, an application server, and another user device), and receiving a group information response that includes at least some of the temporary set of group information.

The method continues at step 146 where the processing module facilitates storage of one or more of context information associated with the temporary set of group information, at least some of the temporary set of group information, at least some of the at least one set of individual information, and at least some of the group information. The method continues at step 148 where the processing module facilitates displaying one or more individual IDs of the at least one set of individual information.

FIG. 5 is a flowchart illustrating an example of obtaining credential information. A method begins at step 150 where a processing module (e.g., an application processing module of a user device) sends a credentials request message. The processing module may send the credentials request message by one or more of sending the message to a user interface output (e.g., a display), sending a message to another user device, sending the message to a user device memory, sending a message to an information server, sending a message to an application server, and sending the message to a remote application server. The credentials may include one or more of a user name, user access rights, a user title, a user role, user responsibilities, a password, an encryption key, user attributes, user capabilities, user certifications, a user training list, a user history, user limitations, user device attributes, and a user geographic location affiliation.

The method continues at step 152 where the processing module receives credentials information. The processing module may receive the credentials information from at least one of a user interface input (e.g., a touchscreen/keyboard), the user device memory, the another user device, the application server, the information server, and the remote application server. The method continues at step 154 where the processing module stores the credentials information (e.g., in the user device memory, by sending the credentials information to one or more of the application server, the information server, and the remote application server).

The method continues at step 156 where the processing module selects credentials information to produce selected credentials information. The selection may be based on one or more of context information (e.g., location and a current event), a credentials type list, a desired credentials list, a credentials type, and a message. For example, the processing module selects the role credential when the role credential type substantially matches a credential list and wherein location information indicates a favorable proximal location to an event. The method continues at step 158 where the processing module transforms selected credentials information to produce registration information. The registration information may include one or more of an individual identifier (ID), the selected credentials information, and the desired credentials.

The method continues at step 160 where the processing module determines a registration entity (e.g., a registration server, a registration application running on the application server, the registration application running on the remote application server, the registration application running on another user device). The determination may be based on one or more of the registration information, a registration entity list, and a registration entity ID associated with the desired credentials. The method continues at step 162 where the processing module sends the registration information to the registration entity. The method continues at step 164 where the processing module processes a registration response message from the registration entity. The processing module processes the registration response message by one or more of storing confirmation information in the user device memory, adding a new credential to a credential list, modifying an existing credential, storing a security signature, storing a new password, and storing a new encryption key.

The above described extraction process may provide an efficiency improvement in an emergency response phase whereby an individual is automatically enabled to participate in a role acceptable to a group or authority associated with an emergency event. For instance, a volunteer certified in cardiopulmonary resuscitation (CPR) is automatically enabled to assist authorities at the scene of the emergency event.

FIG. 6 is a flowchart illustrating an example of obtaining privacy information. A method begins with step 166 where a processing module (e.g., an application processing module of a user device) sends a privacy information request message. The processing module may send the privacy information request message by one or more of sending the message to a user interface output (e.g., a display), sending a message to another user device, sending the message to a user device memory, sending a message to an information server, sending a message to an application server, and sending the message to a remote application server. The privacy information may include one or more of which personal information to never disclose, which information to disclose to individuals affiliated with a plurality of groups, which information to disclose to selected individuals, and which information to disclose to anyone. The personal information may include one or more of a capability, a role, time availability, location availability, location sharing, group affiliations, user device attributes, encryption keys, passwords, signatures, and any other credentials information.

The method continues at step 168 where the processing module receives the privacy information and sorts the privacy information to produce sorted privacy information. The sorting may be based on one or more of a sorting priority, a message, a command, a user input, and context information (e.g., location of an emergency event). For example, the processing module sorts the privacy information such that user capabilities are never shared when the processing module determines the context information does not include a location indicator of any emergency event within a location threshold of a current location indicator. As another example, the processing module sorts the privacy information such that user capabilities are shared when the processing module determines the context information does include a location indicator of an emergency event within the location threshold of the current location indicator. The method continues at step 170 where the processing module stores the sorted privacy information (e.g., in the user device memory, the application server, the information server, the remote application server).

The method continues at step 172 where the processing module identifies shared information based on the sorted privacy information. For example, the processing module determines shared information when an information type associated with the shared information substantially matches an information type associated with the sorted privacy information. For instance, the processing module identifies location information when the sorted privacy information includes sharing the location information type. The method continues at step 174 where the processing module enables access to the shared information based on the identified shared information. The enabling may include one or more of updating a status indicator, setting a flag, and moving the shared information to a shared information memory. Subsequent requests for information contained within the shared information result in responses including the shared information.

The method continues at step 176 where the processing module identifies non-shared information based on the sorted privacy information. For example, the processing module determines non-shared information when the information type associated with the shared information does not match the information type associated with the sorted privacy information. For instance, the processing module identifies certification information when the sorted privacy information does not include sharing the certification information type. The method continues at step 178 where the processing module disables access to the non-shared information based on the identified non-shared information. The disabling may include one or more of updating a status indicator, setting a flag, and moving the non-shared information to a non-shared information memory. Subsequent requests for information contained within the non-shared information result in responses that do not include the non-shared information.

FIG. 7 is a flowchart illustrating an example of obtaining feeds information. A method begins with step 180 where a processing module (e.g., an application processing module of a user device) obtains context information, association information, and credentials information. Alternatively, the processing module may obtain the context information, the association information, and the credentials information by one or more of an application server query, and information server query, a remote application query, the user device query, and a user device memory lookup. The method continues at step 182 where the processing module determines available feeds. The available feeds includes feed identifiers (IDs) associated with one or more information streams (e.g., text streams, audio streams, picture streams, video streams, multimedia streams, etc.). For instance, a weather information stream is associated with a first feed ID. As another instance, an emergency event information stream associated with a second feed ID. The determination of available feeds may be based on one or more of an application server query, an information server query, a remote application server query, a feed stream, a list, and a message.

The method continues at step 184 where the processing module determines recommended feeds based on the context information. The determination may be based on one or more of a favorable comparison of available feeds to one or more of the context information, the association information, and the credentials information. Recommended feeds include a subset of the available feeds, wherein recommended feeds may include a favorable relationship. As an example, the processing module determines a recommended feed to include a weather information stream when the context information indicates proximal location to a severe weather system. As another example, the processing module determines the recommended feed to include a train derailment emergency event information stream when the context information indicates proximal location to a train derailment and the credentials information indicates a favorable emergency response credential.

The method continues at step 186 where the processing module sends a feeds information request message that includes the recommended feeds. For example, the processing module sends the information request message such that the recommended feeds are indicated on a user device display. Alternatively, or in addition to, the processing module sends the feeds information request message that includes the recommended feeds and the available feeds. The method continues at step 188 where the processing module receives selected feeds information (e.g., from a user interface input, from an application server, from an information server). For example, the processing module receives the selected feeds information via a user device touchscreen input. The method continues at step 190 where the processing module stores the selected feeds information (e.g., in a user device memory, in an application server, and an information server).

The method continues at step 192 where the processing module facilitates receiving an information feed based on the selected feeds information. The facilitation may include one or more of sending a subscription request message to an information server, receiving a subscription response message from the information server, receiving an information stream, and extracting the information feed from the information stream. Alternatively, or in addition to, the processing module displays a portion of the information feed on a user interface output (e.g., a color display). The method continues at step 194 where the processing module facilitates storing information feed (e.g., in the user device memory, sending a storage message to an application server, sending the information feed to the information server).

FIG. 8 is a flowchart illustrating an example of selecting a tutorial. A method begins with step 196 where a processing module (e.g., an application processing module of a user device) obtains context information, association information, credentials information, and an information feed. Alternatively, the processing module may obtain the information feed by one or more of an application server query, and information server query, a remote application query, the user device query, and a user device memory lookup. The method continues at step 198 where the processing module determines available tutorials. Available tutorials includes tutorial identifiers (IDs) associated with one or more tutorials. For instance, an earthquake tutorial is associated with a first tutorial ID. As another instance, a hurricane tutorial is associated with a second tutorial ID. The determination of available tutorials may be based on one or more of an application server query, an information server query, a remote application server query, a feed stream, a list, and a message.

The method continues at step 200 where the processing module determines recommended tutorials based on the context information. The determination may be based on one or more of a favorable comparison of available tutorials to one or more of the context information, the association information, the credentials information, and information within the information feed (e.g., an earthquake alert, a hurricane alert). Recommended tutorials include a subset of the available tutorials, wherein recommended tutorials may include a favorable relationship. For example, the processing module determines a recommended tutorial to include the earthquake tutorial when the context information indicates proximal location to an earthquake fault line. As another example, the processing module determines the recommended tutorial to include the hurricane tutorial when the context information indicates proximal location to a hurricane event and the credentials information indicates a favorable emergency response credential.

The method continues at step 202 where the processing module sends a selected tutorials request message that includes the recommended tutorials. For example, the processing module sends the selected tutorials request message such that the recommended tutorials are indicated on a user device display. Alternatively, or in addition to, the processing module sends the selected tutorials request message that includes the recommended tutorials and the available tutorials. The method continues at step 204 where the processing module receives selected tutorial information (e.g., from a user interface input, from an application server, from an information server). For example, the processing module receives the selected tutorial information via a user device touchscreen input.

The method continues at step 206 where the processing module facilitates initializing a tutorial based on the selected tutorial information. The facilitation may include one or more of sending a tutorial request message to an information server, receiving a tutorial response message from the information server, extracting the tutorial from the response message, and initializing the tutorial. The processing module may display tutorial information of the tutorial on the user interface output. The method continues at step 208 where the processing module modifies the tutorial based on one or more of the context information, the association information, the credentials information, and the information feed. For example, the processing module skips portions of the tutorial plan location information of the context information compares unfavorably to a proximal location indicator. For instance, the processing module skips a portion of the tutorial affiliated with cooler climates when the proximal location indicates a warmer climate. As another example, the processing module adds a portion of the context information to the tutorial. For instance, the processing module adds the location information to the tutorial and calculates geographic relationships of one or more locations cited in the tutorial with the location information.

FIG. 9 is a flowchart illustrating an example of selecting a checklist, which include similar steps to FIG. 8. The method begins with step 196 of FIG. 8 where a processing module (e.g., an application processing module of a user device) obtains context information, association information, credentials information, and an information feed. The method continues at step 210 where the processing module determines available checklists. The available checklists includes checklist identifiers (IDs) associated with one or more checklists. For example, a home checklist is associated with a first checklist ID. As another example, a workplace checklist is associated with a second checklist ID. The determination of available checklists may be based on one or more of an application server query, an information server query, a remote application server query, a feed stream, a list, and a message.

The method continues at step 212 where the processing module determines recommended checklists based on the context information. The determination may be based on one or more of a favorable comparison of available checklists to one or more of the context information, the association information, the credentials information, and information within the information feed (e.g., a tornado alert, a wildfire alert). The recommended checklists include a subset of the available checklists, wherein recommended checklists may include a favorable relationship. For example, the processing module determines the recommended checklists to include a tornado checklist when the context information indicates proximal location to a geographic area with a history of frequent tornadoes. As another example, the processing module determines the recommended checklists to include a wildfire checklist when the information feed indicates a wildfire event within a proximal location threshold and the credentials information indicates a favorable emergency response credential.

The method continues at step 214 where the processing module sends a selected checklists request message that includes the recommended checklists. For example, the processing module sends the selected checklists request message such that the recommended checklists are indicated on a user device display. Alternatively, or in addition to, the processing module sends the selected checklists request message that includes the recommended checklists and the available checklists. The method continues at step 216 where the processing module receives selected checklists information (e.g., from a user interface input, from an application server, from an information server). For example, the processing module receives the selected checklists information from a speech recognition algorithm utilizing a user device microphone input. The checklists information may include one or more of emergency preparedness items (e.g., food, water, clothing, tools, etc.), contacts, rally points, resources, associated tutorial IDs, and certification items.

The method continues at step 218 where the processing module facilitates initializing a checklist session based on the selected checklists information. The facilitation may include one or more of sending a checklist request message to an information server, receiving a checklist response message from the information server, extracting a checklist from the response message, and initializing the checklist session. The processing module may display checklist information of the checklist on the user interface output. The method continues at step 220 where the processing module modifies the checklist based on one or more of the context information, the association information, the credentials information, and the information feed. For example, the processing module skips portions of the checklist session when the context information compares unfavorably to a proximal location indicator. For instance, the processing module skips a portion of the checklist affiliated with water emergencies when the proximal location indicates no water nearby. As another example, the processing module adds a portion of the context information to the checklist. For instance, the processing module adds the location information to the checklist and calculates geographic relationships of one or more locations (e.g., resource locales) cited in the checklist with the location information.

FIG. 10 is a flowchart illustrating an example of selecting resources. A method begins with step 222, where a processing module (e.g., an application processing module of a user device) obtains context information, association information, credentials information, checklists, and an information feed. Alternatively, or in addition to, the processing module may retrieve checklists from one or more of a user device memory, an application server, and information server, and a remote application server. The method continues at step 224 where the processing module determines available resource lists. The available resource lists includes resource list identifiers (IDs) associated with one or more resource lists. For instance, a city resource list is associated with a first resource list ID. As another instance, a county resource list is associated with a second resource list ID. The determination of available resource lists may be based on one or more of a user device query, the application server query, the information server query, the remote application server query, a feed stream, a list, and a message.

The method continues at step 226 where the processing module determines recommended resource lists based on the context information. The determination may be based on one or more of a favorable comparison of the available resource lists to one or more of the context information, the association information, the credentials information, content of the checklists, and information within the information feed (e.g., a winter storm alert, a high wind advisory). The recommended resource lists includes a subset of the available resource lists, wherein recommended resource lists may include a favorable relationship. For example, the processing module determines a recommended resource list to include a winter storm resource list when the context information indicates proximal location to a geographic area with a history of severe winter storms. As another example, the processing module determines the recommended resource lists to include a high wind resource list when the information feed indicates a high wind event within a proximal location threshold and the credentials information indicates a favorable emergency response credential.

The method continues at step 228 where the processing module sends a selected resource list request message that includes the recommended resource lists. For example, the processing module sends the selected resource list request message such that the recommended resource lists are indicated on a user device display. Alternatively, or in addition to, the processing module sends the selected resource list request message that includes the recommended resource lists and the available resource lists. The method continues at step 230 where the processing module receives selected resource list information (e.g., from a user interface input, from the application server, from the information server). For example, the processing module receives the selected resource list information from an information server associated with location information. The resource list information may include one or more of emergency response phase assets and/or emergency recovery phase assets (e.g., heavy equipment, vehicles, construction materials, tools, etc.), leadership contacts, staging area locations, training drill sites, funding sources, federal government contacts, state government contacts, local government contacts, industry contacts, and phase assignment roles.

The method continues at step 232 where the processing module facilitates initializing a resource list review session based on the selected resource list information. The facilitation may include one or more of sending a resource list request message to an information server, receiving a resource list response message from the information server, extracting a resource list from the response message, and initializing the resource list review session. The processing module may display resource list information of the resource list on the user interface output. The method continues at step 234 where the processing module modifies the resource list based on one or more of the context information, the association information, the credentials information, and the information feed. For example, the processing module skips portions of the resource list review session when the context information compares unfavorably to a proximal location indicator. For instance, the processing module skips a portion of the resource list review session affiliated with ice rescue emergencies when the proximal location indicates no freezing temperatures nearby. As another example, the processing module adds a portion of the context information to the resource list review session. For instance, the processing module adds the location information to the resource list and calculates geographic relationships of one or more locations (e.g., resource locales) cited in the resource list with the location information.

Alternatively, or in addition to, the processing module may receive resource list modification inputs from a user device input and update the resource list accordingly. Next, the processing module sends the updated resource list to one or more of another user device (e.g., seeking and/or providing resources), the information server (e.g., to post resource needs), and the application processor (e.g., to modify a resource list and context association).

FIG. 11 is a flowchart illustrating an example of determining scenarios information. A method begins with step 236 where a processing module (e.g., an application processing module of a user device) obtains context information, association information, credentials information, checklists, resource lists, and an information feed. Alternatively, or in addition to, the processing module may retrieve the resource lists from one or more of a user device memory, an application server, an information server, and a remote application server. The method continues at step 238 where the processing module determines a possible scenarios list. The possible scenarios list includes scenario identifiers (IDs) associated with one or more scenarios associated with the possible scenario list. For instance, a send help scenario is associated with a first scenario ID. As another instance, a severe weather scenario is associated with a second scenario ID. The determination of the possible scenarios list may be based on one or more of a user device query, the application server query, the information server query, the remote application server query, a feed stream, a list, and a message.

The method continues at step 240 where the processing module determines recommended scenarios based on the context information. The determination may be based on one or more of a favorable comparison of the possible scenarios list to one or more of the context information, the association information, the credentials information, content of the checklists, resources of the resource list, and information within the information feed (e.g., a crime alert, a school lockdown). Recommended scenarios include a subset of the possible scenarios list, wherein recommended scenarios may include a favorable relationship. For example, the processing module determines the recommended scenarios to include a send help scenario when the context information indicates proximal location to a geographic area with a history of violent crime. As another example, the processing module determines the recommended scenarios to include a school lockdown scenario when the information feed indicates a school lockdown event within a proximal location threshold and the credentials information indicates a favorable school affinity.

The method continues at step 242 where the processing module sends a selected scenarios information request message that includes the recommended scenarios. For example, the processing module sends the selected scenarios information request message such that the recommended scenarios are indicated on a user device display. Alternatively, or in addition to, the processing module sends the selected scenarios information request message that includes the recommended scenarios and the possible scenarios list.

The method continues at step 244 where the processing module receives selected scenarios information (e.g., from a user interface input, from the application server, from the information server). For example, the processing module receives the selected scenarios information from an information server associated with location information. The selected scenarios information includes scenario references and/or scenario descriptions (e.g., during a planning phase, a response phase, a recovery phase), scenario triggers, and responsive actions. As an example, a send help scenario includes a user input scenario trigger and a responsive action that includes sending a help message to a list of help target IDs. As another example, an extreme weather scenario includes a weather service alert input scenario trigger and a responsive action that includes selecting a checklist and tutorial associated with a weather alert type of an associated weather service alert. As yet another example, an earthquake scenario includes a state government earthquake alert input scenario trigger and a responsive action that includes selecting a group ID (e.g., a family ID) to determine and share status and location information.

The method continues at step 246 where the processing module facilitates initializing a scenarios review session based on the selected scenarios information. The facilitating may include one or more of sending a scenarios information request message to an information server, receiving a scenarios information response message from the information server, extracting scenarios information from the response message, and initializing the scenarios review session. The processing module may display scenarios information on the user interface output.

The method continues at step 248 where the processing module modifies the scenarios information based on one or more of the context information, the association information, the credentials information, the resources information, and the information feed. For example, the processing module skips portions of the scenarios review session when the context information compares unfavorably to a proximal location indicator. For instance, the processing module skips a portion of the scenarios review session affiliated with earthquake emergencies when the proximal location indicates few or no earthquake fault lines nearby. As another example, the processing module adds a portion of the context information to the scenarios review session. For instance, the processing module adds the location information to the scenarios information and calculates geographic relationships of one or more locations (e.g., help resources) cited in a resource list associated with a scenario.

Alternatively, or in addition to, the processing module may receive scenario information modification inputs from a user device input and update the scenario information accordingly. Next, the processing module sends the updated scenario information to one or more of another user device, the information server (e.g., to download later), and the application processor (e.g., to modify a scenario list and context association).

FIG. 12 is a flowchart illustrating an example of determining schedules information. A method begins with step 250 where a processing module (e.g., an application processing module of a user device) obtains context information, association information, credentials information, checklists, resource lists, scenarios information, and an information feed. Alternatively, or in addition to, the processing module may retrieve the scenarios information from one or more of a user device memory, an application server, an information server, and a remote application server. The method continues at step 252 where the processing module determines a possible schedules list. The possible schedules list includes schedule identifiers (IDs) associated with one or more schedules associated with the possible schedules list. For instance, a drill schedule is associated with a first schedule ID. As another instance, a tutorial schedule is associated with a second schedule ID. As yet another instance, a checklist refresh schedule is associated with a third schedule ID. As a still further instance, a resource list refresh schedule is associated with a fourth schedule ID. The determining of the possible schedules list may be based on one or more of a user device query, the application server query, the information server query, the remote application server query, a feed stream, a list, and a message.

The method continues at step 254 where the processing module determines recommended schedules to update based on the context information. The determining may be based on one or more of a favorable comparison of the possible schedules list to one or more of the context information, the association information, the credentials information, content of the checklists, resources of the resource list, scenarios of the scenarios information, and information within the information feed (e.g., a drill alert, a new tutorial announcement). The recommended schedules include a subset of the possible schedules list, wherein recommended schedules may include a favorable relationship. For example, the processing module determines the recommended schedules to include a drill schedule when the context information indicates proximal location to a government authority hosting an upcoming drill. As another example, the processing module determines the recommended schedules to include a scenarios update schedule when the information feed indicates an upcoming resource planning event within a proximal location threshold and the credentials information indicates a favorable credential with respect to the resource planning event.

The method continues at step 256 where the processing module sends an update schedule information request message that includes the recommended schedules. For example, the processing module sends the update schedule information request message such that the recommended schedules are indicated on a user device display. Alternatively, or in addition to, the processing module sends the update schedule information request message that includes the recommended schedules and the possible schedules list. The method continues at step 258 where the processing module receives selected schedules information (e.g., from a user interface input, from the application server, from the information server). For example, the processing module receives the selected schedules information from an information server associated with drill schedules information. The selected schedules information includes schedule references and/or schedule descriptions (e.g., during a planning phase, a response phase, a recovery phase). As an example, the processing module receives the selected schedules information including a checklist update schedule reference.

The method continues at step 260 where the processing module facilitates initializing a scheduling session based on the selected schedule information. The facilitating may include one or more of sending a schedules information request message to an information server, receiving a schedules information response message from the information server, extracting schedules information from the response message, and initializing the scheduling session. The processing module may display schedules information via the user interface output. The method continues at step 262 where the processing module modifies the schedules information based on one or more of the context information, the association information, the credentials information, the resources information, the scenarios information, and the information feed. For example, the processing module skips portions of the scheduling session when the context information compares unfavorably to a proximal location indicator. For instance, the processing module skips a portion of the scheduling session affiliated with drills when the proximal location indicates few or no earthquake fault lines nearby. As another example, the processing module adds a portion of the context information to the scheduling information. For instance, the processing module adds the location information to the scheduling information and calculates geographic relationships of one or more locations (e.g., participating drill authorities) cited in a drill schedule associated with a schedule.

Alternatively, or in addition to, the processing module may receive schedule information modification inputs from a user device input and update the scheduling information accordingly. Next, the processing module sends the updated scheduling information to one or more of another user device, the information server (e.g., to download later), and the application processor (e.g., to modify a possible schedules list and context association).

FIG. 13 is a flowchart illustrating an example of determining environmental information. A method begins with step 264 where a processing module (e.g., an application processing module of a user device) obtaining context information, association information, credentials information, checklists, resource lists, scenarios information, schedule information, and an information feed. Alternatively, or in addition to, the processing module may retrieve the schedule information from one or more of a user device memory, an application server, an information server, and a remote application server. The method continues at step 266 where the processing module determines a region based on group location. The region specifies a geographic area associated with a group. For example, the region is a circle wherein the circle is specified by coordinates (e.g., longitude and latitude) of a center location and a radius distance from the center location. As another example, the region is specified by an arbitrary boundary around the region (e.g., a continuum of longitude and latitude coordinates). As yet another example, the region is specified by a governmental jurisdiction (e.g., one or more city blocks, one or more neighborhoods, one or more cities, one or more counties, one or more states). The determining of the region may be based on one or more of determining individuals affiliated with the group, obtaining individual location information associated with at least some individuals affiliated with the group, and determining the region based on the individual location information. For example, the processing module determines the individuals associated with the group based on a group affiliation table lookup in a user device memory. Next, the processing module sends an individual location information request message to user devices associated with at least some of the individuals associated with the group. The processing module receives a plurality of individual location information response messages to produce a plurality of individual location information. The processing module determines the region such that the region encompasses the plurality of individual location information.

The method continues at step 268 where the processing module determines weather information based on the region. The weather information may include one or more of current weather conditions, weather forecasts, weather alerts, weather advisories, weather history, and a weather dictionary. The determining may be based on one or more of the region, a query to one or more weather information servers, receiving an internet broadcast, receiving a wireless broadcast. For example, the processing module sends a weather information request message to the weather information server wherein the weather information request message includes the region. The processing module receives a weather information response message that includes the weather information.

The method continues at step 270 where the processing module determines checklist highlights and resource needs based on the weather information. The checklist highlights includes selected checklist items with more relative importance than remaining checklist items with regards to the weather information. The resource needs includes selected resources with more relative importance than remaining resources with regards to the weather information. The determining may be based on one or more of the weather information, a checklist, a resource list, a checklist item to weather information correlation list, a resource item to weather information correlation list, and a favorable comparison of the weather information to one or more checklist items or to one or more resource list items. For example, the processing module determines the checklist highlights to include a raingear checklist item when the weather information indicates heavy rain in the region. As another example, the processing module determines the resource needs to include heavy snow removal machinery when the weather information indicates a high avalanche risk in the region.

The method continues at step 272 where the processing module displays the weather information, the checklist highlights, and the resource needs. Alternatively, or in addition to, the processing module sends the weather information, the checklist highlights, and the resource needs to one or more of the user devices associated with individuals affiliated with the group. The method continues at step 274 where the processing module sends a resource needs message to one or more of another user device, the application server, information server, and the remote application server, wherein the resource needs message includes one or more of the resource needs, the weather information, an individual identifier (ID), and a group ID.

Figures 14, 15:
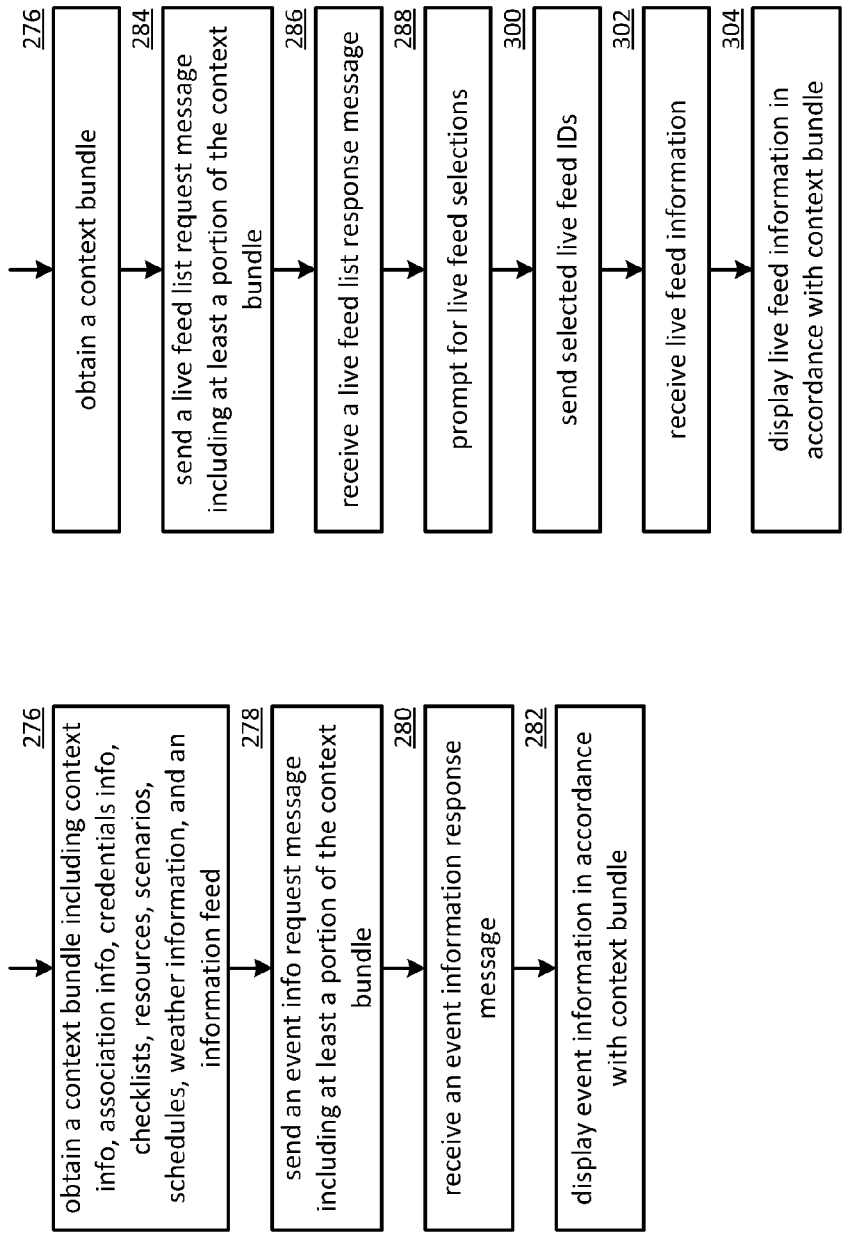
FIG. 14 is a flowchart illustrating an example of determining event information in accordance with the invention.
FIG. 15 is a flowchart illustrating an example of selecting live feed information in accordance with the invention.

FIG. 14 is a flowchart illustrating an example of determining event information. A method begins with step 276 where a processing module (e.g., an application processing module of a user device) obtaining a context bundle that includes context information, association information, credentials information, checklists, resource lists, scenarios information, schedule information, weather information, and an information feed. Alternatively, or in addition to, the processing module may retrieve the weather information from one or more of a user device memory, an application server, an information server, and a remote application server.

The method continues at step 278 where the processing module sends an event information request message including at least a portion of the context bundle. For example, the processing module sends the event information request message to the information server, wherein the event information request message includes an individual identifier (ID), a group ID, location information, and a credential. The information server receives the event information request message and determines event information based on the event information request message and event information within the information server. For example, information server determines the event information to include events within a distance threshold of a location specified by the location information when the credential compares favorably to a credential authorization list for the individual ID.

The event information may include one or more of an event ID, an event description, an event type, an event location, event resources required, event issues, event responsible individuals, event chain of command, and event timeline information. The event type may include one or more of a flood, a hailstorm, a rainstorm, a snowstorm, high winds, a tornado, a hurricane, an earthquake, a landslide, a wildfire, a forest fire, a building fire, an explosion, a train derailment, a traffic accident, a building collapse, a bombing, a hazardous substance, a chemical spill, a biological threat, and a nuclear threat. Next, the information server sends an event information response message to the processing module, wherein the event information response message includes the event information.

The method continues at step 280 where the processing module receives the event information response message. The method continues at step 282 where the processing module displays the event information in accordance with the context bundle. For example, the processing module displays the event information in a ranked order with respect to distance from the location information. As another example, the processing module displays the event information in a ranked order with respect to an association with one or more credentials of the credentials information. For instance, the processing module ranks events associated with fire above other events when the credential information indicates a fire service association (e.g., a volunteer firefighter). As another example, the processing module displays the event information in a ranked order with respect to resources of the resource list. For instance, the processing module ranks events associated with resource needs for paramedics when a resource of the resource list indicates a paramedic capability.

FIG. 15 is a flowchart illustrating an example of selecting live feed information, which includes similar steps to FIG. 14. The method begins with step 276 of FIG. 14 where a processing module (e.g., an application processing module of a user device) obtains a context bundle. The method continues at step 284 where the processing module sends a live feed list request message, wherein the live feed request message includes at least a portion of the context bundle. The live feed may include a real-time information flow from one or more of a federal government entity, a state government entity, a local government entity, and a private sector entity (e.g., an internet radio source, an internet information source, a broadcast network, etc.).

A format of the live feed may include one or more of a text stream, an audio stream, a picture stream, a video stream, and a multimedia stream. For example, the processing module sends the live feed list request message to an application server, wherein the live feed list request message includes location information associated with a user device. As another example, the processing module sends the live feed list request message to an information server, wherein the live feed list request message includes credentials information associated with the user device. The application server and/or the information server receives the live feed list request message and determines a plurality of live feeds based on the at least the portion of the context bundle. For example, the application server determines the plurality of live feeds associated with at least a location within a distance threshold of location information of the context bundle. As another example, the information server determines the plurality of live feeds associated with a credential (e.g., a first aid relief worker) of the context bundle.

The method continues at step 286 where the processing module receives a live feed list response message that includes identifiers (IDs) of the plurality of live feeds. The method continues at step 288 where the processing module prompts for live feed selections to produce selected live feeds. For example, the processing module displays live feed information (e.g., a live feed name, a live feed description) associated with the IDs of the plurality of live feeds rank ordered by relevance to the context bundle. For instance, the processing module rank orders live feeds that are associated with locations that compare more favorably (e.g., closer) to the location information of the context bundle before other live feeds. As another instance, the processing module rank orders live feeds that are associated with a group ID of association information of the context bundle before other live feeds. Next, the processing module receives selected live feed IDs (e.g., from an input user interface).

The method continues at step 300 where the processing module sends the selected live feed IDs (e.g., to the application server and/or to the information server). The method continues at step 302 where the processing module receives live feed information (e.g., streaming information). The method continues at step 304 where the processing module displays the live feed information in accordance with the context bundle. For example, the processing module always displays the live feed information as a scroll of text across the bottom of a color display associated with a user device. As another example, the processing module only displays the live feed information on screens associated with higher priority context bundle information. For instance, the processing module displays drilling event associated live feed information when a currently active screen includes drill information and/or drill selection. As another instance, the processing module displays high priority weather alert associated live feed information on all screens.

Figures 16, 17:
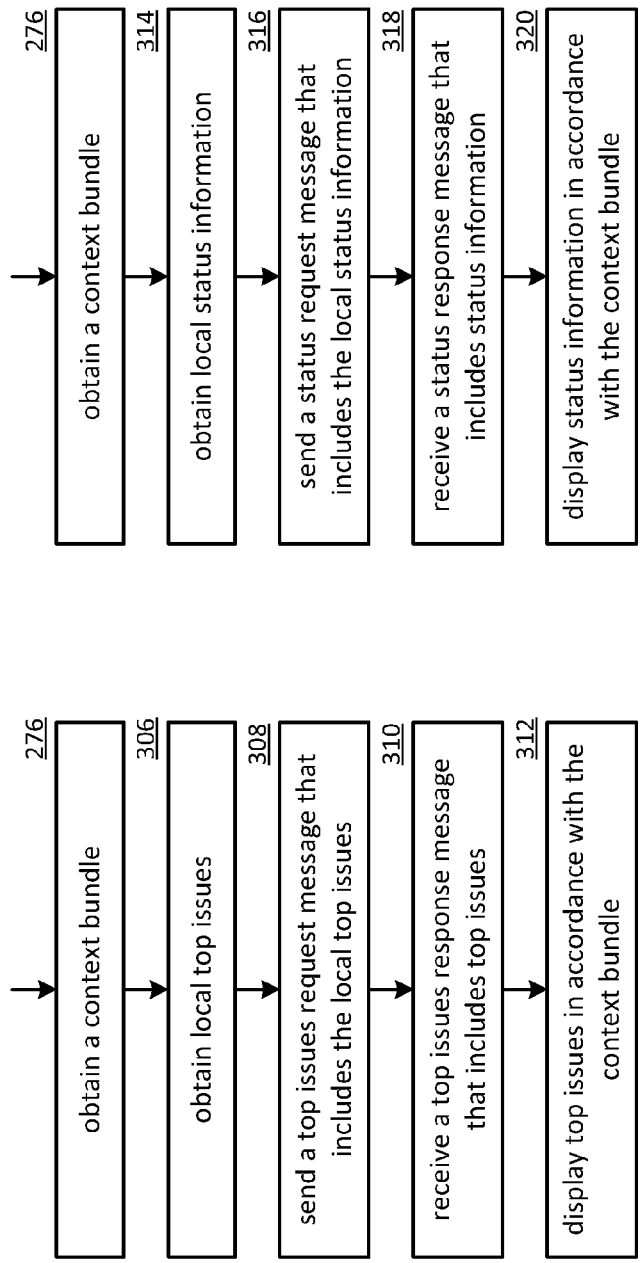
FIG. 16 is a flowchart illustrating an example of obtaining top issues information in accordance with the invention.
FIG. 17 is a flowchart illustrating an example of obtaining status information in accordance with the invention.

FIG. 16 is a flowchart illustrating an example of obtaining top issues information, which includes similar steps to FIG. 14. The method begins with step 276 of FIG. 14 where a processing module (e.g., an application processing module of a user device) obtaining a context bundle. The method continues at step 306 where the processing module obtains local top issues. The top issues include high-priority problems with respect to a user and/or a group. The obtaining may be based on one or more of a user input, a resource list, local environmental information, and local event information. For example, the processing module obtains local top issues via a user input that includes a need for medical attention. As another example, the processing module obtains local top issues by extracting the local environmental information from weather information and/or from one or more user device sensors (e.g., a barometer, a temperature sensor). For instance, the local environmental information indicates a temperature above 110° F. As another example, the processing module obtains local top issues by extracting a resource need from a resource list. For instance, the resource need indicates a need for more drinking water.

The method continues at step 308 where the processing module sends a top issues request message that includes the local top issues. For example, the processing module sends the top issues request message to an information server. Next, the information server aggregates the top issues request message with other top issues request messages to produce aggregated top issues. The information server sends a top issues response message that includes the aggregated top issues to the processing module. The method continues at step 310 where the processing module receives the top issues response message.

The method continues at step 312 where the processing module displays the aggregated top issues in accordance with the context bundle. For example, the processing module displays issues of the aggregated top issues in a rank order starting with issues that are associated with user capabilities of the context bundle. For instance, the processing module displays issues associated with a user capability of driving a truck first when the issues are associated with a need for a resource to drive a truck. As another example, the processing module displays issues of the aggregated top issues in a rank order starting with issues that are associated with events within a geographic distance threshold of location information of a group identifier (ID) of the context bundle. For instance, the processing module displays issues associated with events that are within 5 miles of individuals affiliated with group ID 457 first.

FIG. 17 is a flowchart illustrating an example of obtaining status information, which includes similar steps to FIG. 14. The method begins with step 276 of FIG. 14 where a processing module (e.g., an application processing module of a user device) obtains a context bundle. The method continues at step 314 where the processing module obtains local status. The local status includes status of an individual and/or a group. The status may include an indicator of a status of a user of a user device including one or more of okay, not okay, need help, don't need help, online, and off-line. The obtaining may be based on one or more of a user input, local environmental information, a list, and local event information. For example, the processing module obtains local status information via a user input that includes the not okay indicator and text indicating a need for medical attention. As another example, the processing module obtains local status information by extracting the local environmental information from weather information and/or from one or more user device sensors (e.g., a barometer, a temperature sensor). For instance, the local environmental information indicates a barometric pressure sensor output within a predicted range of weather information.

The method continues at step 316 where the processing module sends a status request message that includes the local status information. For example, the processing module sends the status request message to an information server. Next, the information server aggregates the status request message with other status request messages to produce aggregated status information. The information server sends a status response message that includes the aggregated status information to the processing module.

The method continues at step 318 where the processing module receives the status response message. The method continues at step 320 where the processing module displays the aggregated status information in accordance with the context bundle. For example, the processing module displays individual status information for individuals affiliated with a group identifier (ID) associated with the processing module. For instance, the processing module displays names along with a colored icon wherein a color of the colored icon color represents a status condition (e.g., red or not okay, green for okay, yellow for getting help, flashing forward no recent status). Alternatively, or in addition to, the processing module displays the individual status information and a text message of an individual associated with the individual status information. For instance, the processing module displays a name with the red colored icon along with a short text message "need medical attention." As another example, the processing module displays names with the colored icon in a rank order starting with names that are within a geographic distance threshold of location information of an individual ID of the context bundle (e.g., a user device associated with the processing module). For instance, the processing module displays names affiliated with group ID 457 that are within 5 miles of the user device. As yet another example, the processing module displays names with the colored icon on a map, wherein the icon is placed on the map at a location indicated by the status information associated with the corresponding name.

Figures 18, 19:
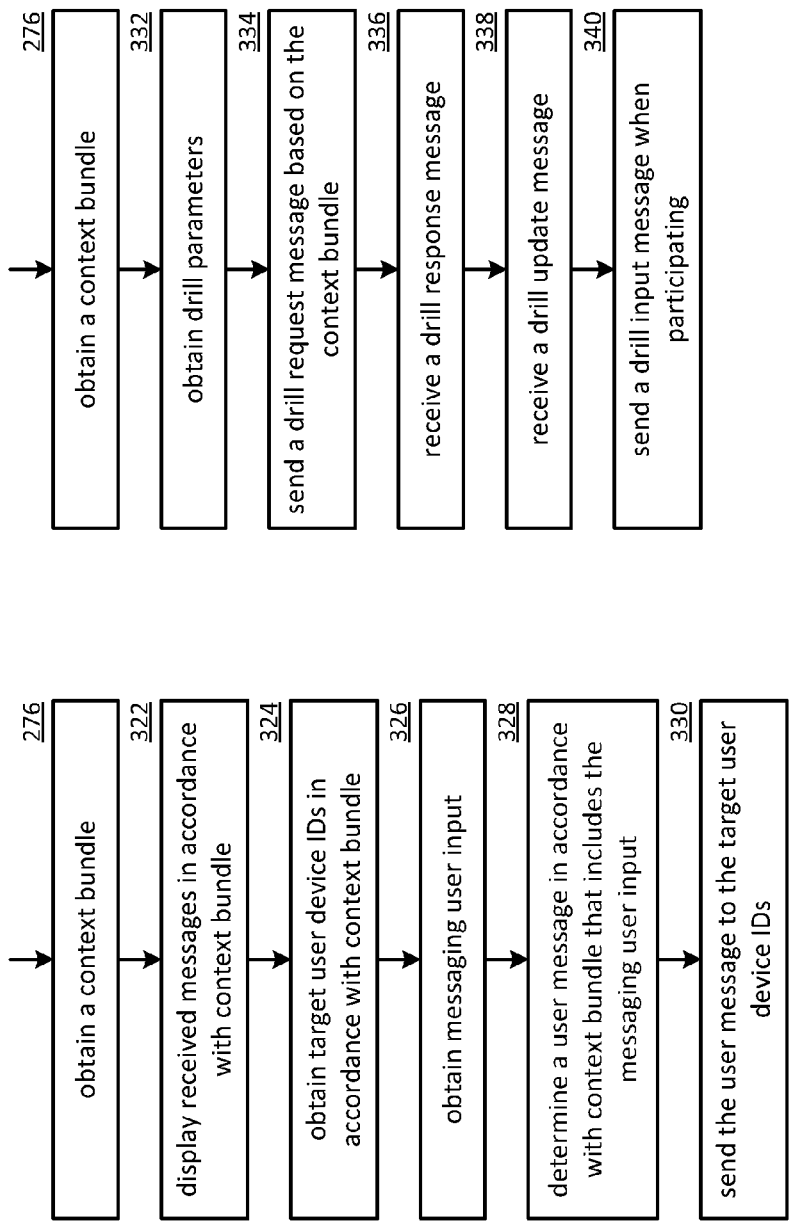
FIG. 18 is a flowchart illustrating an example of selecting message targets in accordance with the invention.
FIG. 19 is a flowchart illustrating an example of initiating a drill sequence in accordance with the invention.

FIG. 18 is a flowchart illustrating an example of selecting message targets, which includes similar steps to FIG. 14. The method begins with step 276 of FIG. 14 where a processing module (e.g., an application processing module of a user device) obtains a context bundle. The method continues at step 322 where the processing module displays received messages in accordance with the context bundle by routing received messages to at least one user interface output. The receive messages may include one or more of text messages, short message service (SMS) messages, data messages, telemetry messages, encrypted messages, email messages, voicemail messages, voice dispatch messages, broadcast messages, many-to-one messages, and one-to-many messages. For example, the processing module displays received text messages rank ordered by group identifiers (IDs) associated with a user device. In another example, the processing module displays received SMS messages rank ordered by distance proximity of a location associated with an event associated with each SMS message to location information of the user device.

The method continues at step 324 where the processing module obtains target user device IDs in accordance with the context bundle. The target user device ID includes a user device ID associated with an intended recipient of a subsequent message. The obtaining may include one or more of receiving a user interface input (e.g., text entry), retrieving a list, utilizing a predetermination, looking up one or more individual IDs affiliated with a group ID of the context bundle, and receiving a user interface input in response to displaying recommended one or more individual IDs affiliated with the user device and/or event associated with the user device.

The method continues at step 326 where the processing module obtains messaging user input. The obtaining may include or more of receiving a user interface input (e.g., free-form text), retrieving a predetermined message, selecting a message from a message list in accordance with a status of the context bundle, and selecting a message from the message list in accordance with location information of the context bundle. For example, the processing module obtains the messaging user input based on selecting a location message from the message list, wherein the messaging user input includes text of "I'm okay and at Main Street and Sixth Avenue" when the location information indicates global positioning satellite (GPS) data corresponding to a location at Main Street and Sixth Avenue and status information of the context bundle indicates an okay status.

The method continues at step 328 where the processing module determines a user message in accordance with a context bundle that includes the messaging user input. For example, the processing module aggregates the messaging user input with at least some of the context bundle to produce the user message. For instance, the processing module aggregates the messaging user input text of "our family is to meet at the Church Street rally point as soon as possible", the location information of the context bundle, and status information of the context bundle to produce the user message.

The method continues at step 330 where the processing module sends the user message to the target user device IDs. For example, the processing module sends the user message to user device IDs affiliated with a family group ID. Alternatively, or in addition to, processing module sends the user message to the family group ID as a target ID. As another example, the processing module sends a message of the message list in accordance with a button push detection or sensor value detection of the context bundle. For instance, the processing module sends a text of "send help" along with location information when a send help button is activated. As another instance, the processing module sends the text of "send help" along with the location information when an accelerometer sensor of a user device detects an SOS Morse code pattern within a shaking sequence.

Alternatively, or in addition to, the processing module sends location information and other portions of the context bundle to an application server from time to time. Next, the application server identifies messages and/or message streams associated with the location information. The application server sends the messages and/or message streams to the processing module. In an example of operation, the processing module sends the application server a public safety credential of the context bundle and location information every two minutes. Next, the application server verifies (e.g., via an access control list lookup) that the public safety credential authorizes a user device associated with the public safety credential to monitor public safety communications. The application server sends a public safety was communications message stream to the user device associated with the processing module. The processing module receives the message stream and routes the voice message stream to a speaker of the user device.

FIG. 19 is a flowchart illustrating an example of initiating a drill sequence, which includes similar steps to FIG. 14. The method begins with step 276 of FIG. 14 where a processing module (e.g., an application processing module of a user device) obtains a context bundle. The method continues at step 332 where the processing module obtains drill parameters. The drill parameters may include one or more of individual identifiers (IDs), group IDs, a start time, an end time, a drill type, a drill location, drill constraints, and a drill template. The obtaining may be based on one or more of receiving a user input, a query, a list, and a message.

The method continues at step 334 where the processing module sends a drill request message. The drill request message may include one or more of the drill parameters, an individual ID, a group ID, and at least a portion of the context bundle. For example, the processing module sends the drill request message to an application server. Next the application server processes the drill request message to produce a drill response message. The drill response message may include one or more of a drill ID, drill parameters, and an existing or new drill indicator. For instance, the application server produces the drill response message to include the new drill indicator when active drills include associated drill parameters that compare unfavorably to the drill parameters (e.g., requested by the processing module). As another instance, application server produces the drill response message to include an existing drill indicator and associated drill ID when an active drill includes associated drill parameters that compare favorably to the drill parameters. The application server sends the drill response message to the processing module.

The method continues at step 336 for the processing module receives the drill response message. The method continues at step 338 where the processing module receives a drill update message wherein the drill update message includes one or more of a drill ID, drill parameters, a drill state, drill issue, a drill question, desired drill outcomes, and actual drill outcomes. Next, the processing module displays at least some of the drill update message. The processing module receives drill input in response to displaying at least some of the drill update message. For instance, a user interface input receives a text stream indicating a next move in the drill in response to the drill question. The method continues at step 340 where the processing module sends a drill input message when a drill engagement indicator indicates participation in the drill rather than monitoring the drill. The drill input message may include one or more of an individual ID, a group ID, a portion of the context bundle, drill question answers, comments, resource list, commands, instructions, requests, status, and other input.

FIG. 20 is a flowchart illustrating an example of participating in a drill sequence, which includes similar steps to FIGS. 14 and 19. The method begins with step 276 of FIG. 14 where a processing module (e.g., an application processing module of a user device) obtains a context bundle. The method continues at step 342 where the processing module sends an identify drill request message that includes at least a portion of the context bundle. For example, the processing module sends the identify drill request message to an application server that includes an individual identifier (ID), a group ID, and an emergency medical team credential. Next, the application server identifies a plurality of drill IDs of active drills in progress that compare favorably to the identify drill request message. For instance, the application server identifies three drill IDs of active drills in progress that are associated with emergency medical team drills when the identify drill request message includes the emergency medical team credential. Next, the application server sends an identify drill response message that includes one or more of the plurality of drill IDs and drill descriptors associated with the plurality of drill IDs.

The method continues at step 344 where the processing module receives the identify drill response message. The method continues at step 346 where the processing module selects a drill ID of the plurality of drill IDs extracted from the identify drill response message to produce a selected drill ID. The selecting may be based on one or more of displaying the plurality of drill IDs and drill descriptors in a rank order favorable with the context bundle (e.g., by closest location, by affiliation with association information, by affiliation with a credential) receiving a user interface input, the plurality of drill IDs, drill descriptors, a prioritization order, the context bundle a list, and a message.

The method continues at step 348 where the processing module sends a join drill request message that includes the drill ID. For example, the processing module sends the join drill request message to the application server, wherein the join drill request message includes an individual ID, and the drill ID. Next, the application server adds the individual ID to a list of participants of a drill associated with the drill ID. The application server sends a join drill response message to the processing module that includes one or more of an indicator confirming that the individual ID is listed as a participant of the drill associated with the drill ID, the drill ID, and drill parameters. The method continues at step 350 where the processing module receives the join drill response message. The method continues at steps 338-340 of FIG. 19 where the processing module receives a drill update message and sends a drill input message when participating.

FIG. 21 is a flowchart illustrating an example of executing a drill tutorial, which includes similar steps to FIG. 14. The method begins with step 276 of FIG. 14 where a processing module (e.g., an application processing module of a user device) obtains a context bundle. The method continues at step 352 where the processing module selects a drill tutorial to produce a selected drill tutorial ID. The selecting may be based on one or more of a list of drill types, the context bundle, a list of drill tutorial IDs, a message, and receiving a user interface input. For example, the processing module displays the list of drill tutorial IDs and associated drill types rank ordering the top of the list with drill types that compare favorably to event information and/or location information of the context bundle. For instance, the processing module displays drill tutorial IDs at the top of the list that are associated with water rescue when a fast water rescue event is active within a distance threshold of location information of the context bundle. Next, the processing module receives the user interface input.

The method continues at step 354 where the processing module displays tutorial instructions based on stored/and or received tutorial instructions. The tutorial instructions may include one or more of a drill descriptor, the drill ID, why drill, how the drill works, drill objectives, and drill participation guidance. The method continues at step 356 where the processing module displays a drill update message simulating a step of a drill. The drill update message includes elements as previously discussed with reference to FIG. 19.

The method continues at step 358 where the processing module obtains a drill input message, wherein the drill input message is as previously discussed with reference to FIG. 19. The method continues at step 360 where the processing module determines whether the drill tutorial session is over based on last steps executed and the number of steps associated with the drill tutorial. For example, the processing module determines that the drill session is over when a last step executed is substantially the same as a last step of a number of steps of the drill tutorial. The method repeats back to step 358 when the processing module determines that the drill session is not over. The method continues to step 362 when the processing module determines that the drill session is over.

The method continues at step 362 where the processing module determines and saves drill summary information. The drill summary information may include one or more of drill issues, drill solutions, an effectiveness rating, and an evaluation. The evaluation may be determined based on a comparison of drill results to desired drill results of a desired drill results list. The method continues at step 364 where the processing module displays at least some of the drill summary information As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a processing module of a user device, the method comprises:
    establishing, by the user device, information regarding a potentially adverse event, wherein the information includes one or more of: geographic location coordinates of the potentially adverse event, an identifier of the potentially adverse event, and a relevant time period of the potentially adverse event;
    determining, by the user device, group constraints for a group regarding the potentially adverse event, wherein the group constraints includes one or more of: family member devices, neighbor devices, friend devices, first responders, co-workers, and devices of other persons having an affiliating commonality;
    determining, by the user device, whether a temporary group exists regarding the potentially adverse event and that is in accordance with the group constraints; and
    when the temporary group exists regarding the potentially adverse event that is in accordance with the group constraints:
        identifying, by the user device, event response information regarding the potentially adverse event; and
        selecting, by the user device, a portion of the event response information.

2. The method of claim 1, wherein the information regarding the potentially adverse event further comprises one or more of:
    one or more sets of geographic location coordinates;
    current weather conditions;
    forecasted weather conditions;
    a sensor input;
    date information;
    time information;
    a current activity;
    a scheduled activity;
    a current event; and
    a scheduled event.

3. The method of claim 1, wherein the establishing the information regarding the potentially adverse event comprises at least one of:
    querying an application server;
    receiving a message;
    a local memory lookup;
    receiving an input device output;
    receiving a user device sensor output; and
    decoding wireless location signals to produce location coordinates.

4. The method of claim 1, wherein the determining the group constraints comprises at least one of:
    receiving at least some of the group constraints from a user input;
    identifying a group constraint associated with the at least one of the information regarding the potentially adverse event and the user device; and
    retrieving the group constraints.

5. The method of claim 1, wherein the determining whether the temporary group exists comprises:
    generating a temporary group information request based on at least one of the information regarding the potentially adverse event and the group constraints;
    facilitating outputting the temporary group information request; and
    receiving a group information response that includes at least one of a group identifier of the temporary group and an indicator that the temporary group does exist.

6. The method of claim 1, wherein the event response information regarding the potentially adverse event comprises one or more of:
    one or more real-time information feeds;
    an internet radio source;
    an internet information source;
    a broadcast network source;
    a government information source; and
    a private sector information source.

7. The method of claim 1, wherein the identifying the event response information regarding the potentially adverse event comprises at least one of:
    generating an event response information request based on at least one of the information regarding the potentially adverse event and the group constraints;
    facilitating outputting the event response information request; and
    receiving an event response information response that includes the event response information.

8. The method of claim 1, wherein the selecting the portion of the event response information comprises at least one of:
    outputting a user prompt that includes at least some of the event response information;
    receiving a portion selection user input;
    identifying a plurality of predetermined information types based on the potentially adverse event that is in accordance with the group constraints as the portion of the event response information; and
    identifying a live feed source associated with location coordinates that are substantially the same as location coordinates of the user device as the portion of the event response information, wherein a plurality of live feed sources of the event response information includes the identified live feed source and wherein each of the plurality of live feed sources is associated with corresponding location coordinates.

9. The method of claim 1 further comprises:
    when the temporary group exists regarding the potentially adverse event that is in accordance with the group constraints, joining, by the user device, the temporary group regarding the potential adverse event that is in accordance with the group constraints.

10. The method of claim 1 further comprises:
    facilitating, by the user device, displaying the portion of the event response information.

11. A computing device comprises:
    an interface;
    a display;
    a memory; and a processing module operably coupled to the interface, the display, and the memory, wherein the processing module functions to:
  establish information regarding a potentially adverse event, wherein the information includes one or more of: geographic location coordinates of the potentially adverse event, an identifier of the potentially adverse event, and a relevant time period of the potentially adverse event;
  determine group constraints for a group regarding the potentially adverse event, wherein the group constraints includes one or more of: family member devices, neighbor devices, friend devices, first responders, co-workers, and devices of other persons having an affiliating commonality;
  determine whether a temporary group exists regarding the potentially adverse event and that is in accordance with the group constraints; and
  when the temporary group exists regarding the potentially adverse event that is in accordance with the group constraints:
    identify event response information regarding the potentially adverse event; and
    select a portion of the event response information.

12. The computing device of claim 11, wherein the information regarding the potentially adverse event further comprises one or more of:
  one or more sets of geographic location coordinates;
  current weather conditions;
  forecasted weather conditions;
  a sensor input;
  date information;
  time information;
  a current activity;
  a scheduled activity;
  a current event; and
  a scheduled event.

13. The computing device of claim 11, wherein the processing module functions to establish the information regarding the potentially adverse event by at least one of:
  querying, via the interface, an application server;
  receiving, via the interface, a message;
  performing a lookup in the memory;
  receiving, via the interface, an input device output;
  receiving, via the interface, a user device sensor output; and
  decoding wireless location signals to produce location coordinates.

14. The computing device of claim 11, wherein the processing module functions to determine the group constraints by at least one of:
  receiving, via the interface, at least some of the group constraints from a user input;
  identifying a group constraint associated with the at least one of the information regarding the potentially adverse event and a user device; and
  retrieving, from the memory, the group constraints.

15. The computing device of claim 11, wherein the processing module functions to determine whether the temporary group exists by:
  generating a temporary group information request based on at least one of the information regarding the potentially adverse event and the group constraints;
  facilitating outputting, via the interface, the temporary group information request; and
  receiving, via the interface, a group information response that includes at least one of a group identifier of the temporary group and an indicator that the temporary group does exist.

16. The computing device of claim 11, wherein the event response information regarding the potentially adverse event comprises one or more of:
  one or more real-time information feeds;
  an internet radio source;
  an internet information source;
  a broadcast network source;
  a government information source; and
  a private sector information source.

17. The computing device of claim 11, wherein the processing module functions to identify the event response information regarding the potentially adverse event by at least one of:
  generating an event response information request based on at least one of the information regarding the potentially adverse event and the group constraints;
  facilitating outputting, via the interface, the event response information request; and
  receiving, via the interface, an event response information response that includes the event response information.

18. The computing device of claim 11, wherein the processing module functions to select the portion of the event response information by at least one of:
  outputting, via the interface, a user prompt that includes at least some of the event response information;
  receiving, via the interface, a portion selection user input;
  identifying a plurality of predetermined information types based on the potentially adverse event that is in accordance with the group constraints as the portion of the event response information; and
  identifying a live feed source associated with location coordinates that are substantially the same as location coordinates of the user device as the portion of the event response information, wherein a plurality of live feed sources of the event response information includes the identified live feed source and wherein each of the plurality of live feed sources is associated with corresponding location coordinates.

19. The computing device of claim 11, where the processing module further functions to:
  when the temporary group exists regarding the potentially adverse event that is in accordance with the group constraints, join the temporary group regarding the potential adverse event that is in accordance with the group constraints.

20. The computing device of claim 11, where the processing module further functions to:
  facilitate, via the display, displaying the portion of the event response information.

* * * * *